United States Patent

Namba et al.

[11] Patent Number: 5,884,249
[45] Date of Patent: Mar. 16, 1999

[54] INPUT DEVICE, INPUTTING METHOD, INFORMATION PROCESSING SYSTEM, AND INPUT INFORMATION MANAGING METHOD

[75] Inventors: Yasuharu Namba, Yokohama; Shunichi Tano, Sagamihara; Kiyoshi Kozuka, Yokohama, all of Japan

[73] Assignee: Hitachi, Ltd., Tokyo, Japan

[21] Appl. No.: 620,923

[22] Filed: Mar. 22, 1996

[30] Foreign Application Priority Data

Mar. 23, 1995 [JP] Japan ................................... 7-064117

[51] Int. Cl.⁶ .............................. G06F 17/27; G10L 3/00
[52] U.S. Cl. ................................ 704/9; 704/275
[58] Field of Search ............................ 704/1, 3, 9, 275, 704/246, 251; 364/275.9, 238.3

[56] References Cited

U.S. PATENT DOCUMENTS

| | | | |
|---|---|---|---|
| 5,386,494 | 1/1995 | White | 704/575 |
| 5,600,765 | 2/1997 | Ando et al. | 395/133 |
| 5,677,993 | 10/1997 | Ohga et al. | 704/275 |

FOREIGN PATENT DOCUMENTS

| | | |
|---|---|---|
| 1-41922 | 2/1989 | Japan . |
| 1-33682 | 3/1989 | Japan . |
| 2-186421 | 7/1990 | Japan . |
| 3264931 | 4/1993 | Japan . |
| 9525326 | 9/1995 | WIPO . |

OTHER PUBLICATIONS

"If–Kit: A Natural Language Interface Development Kit", Technical Report on the Institute of Electronics.

"A Menu–Based Spoken Natural Language Input System" Processings of the 47th (latter half of 1993) Annual Convention, Information Processing Society of Japan.

"Integrated Audio–Graphics User Interface", IBM Technical Disclosure Bulletin, 33(11):368–71, Apr. 1991.

*Primary Examiner*—David R. Hudspeth
*Assistant Examiner*—Patrick N. Edouard
*Attorney, Agent, or Firm*—Fay Sharpe Beall Fagan Minnich & McKee

[57] ABSTRACT

An input device which includes plural inputting units, each accepting external information, including a unit for recognizing an input time of input information accepted via each of the plural inputting means; a unit for dividing or merging the input information into a predetermined primitive analysis unit, to obtain a recognition result; a unit for estimating the input time of a unit recognition result, by using an estimating method predetermined for each of the inputting units; and a unit for collecting some of the recognition results whose estimated input times are close to one another, and outputting the collected information as a semantic analysis unit. An input content is specified by collecting plural pieces of input information being signals input from plural inputting units.

34 Claims, 15 Drawing Sheets

FIG.3

| SEMANTIC ANALYSIS UNIT 20 | OPERATIONAL INSTRUCTION CONTENTS 21 |
|---|---|
| "DETAIL THIS" "14(H):25(M):33(S)" (12,23) "14(H):23(M):34(S)" | OPERATION INSTRUCTION FUNCTION: DISPLAY<br>OPERATION INSTRUCTION CONDITION: DETAIL<br>OPERATION INSTRUCTION OBJECT: WORK_TABLE_2 |
| "DETAIL" "@S"<br>"THIS" "@T(WHERE @T<S+4)"<br>(@X, @Y) "@U(WHERE ǀ @U-@T ǀ <2)" | OPERATION INSTRUCTION FUNCTION: DISPLAY<br>OPERATION INSTRUCTION CONDITION: DETAIL<br>OPERATION INSTRUCTION OBJECT: @table_ID(@X,@Y) |

| 22 | 23 |
|---|---|
| OPERATION INSTRUCTION CONTENTS | COMMAND CHARACTER STRING |
| OPERATION INSTRUCTION FUNCTION: DISPLAY<br>OPERATION INSTRUCTION CONDITION: DETAIL<br>OPERATION INSTRUCTION OBJECT: @A | DISPLAY -DETAIL @A |

11

| RECOGNITION RESULT | TIME STAMP |
|---|---|
| "DETAIL THIS" | "14(H) : 25(M) : 33(S) |
| (12, 23) | "14(H) : 25(M) : 34(S) |

| RECOGNITION RESULT | TIME STAMP |
|---|---|
| "DETAIL" | "14(H) : 25(M) : 30(S) |
| "THIS" | "14(H) : 25(M) : 33(S) |
| (12, 23) | "14(H) : 25(M) : 34(S) |

| CLASSIFICATION ITEMS | AN EXAMPLE OF TIME ATTRIBUTE USED IN ESTIMATION |
|---|---|
| INPUT OPERATION | • KEY ARRANGEMENT (FAST ENTRY CHARACTERS (SUCH AS 'a' AND 'f') AND SLOW ENTRY CHARACTERS (SUCH AS 'Q' AND '&' ENTERED WITH SHIFT KEY COMBINED)<br><br>• NUMBER AND COMPLEXITY OF A CHARACTER STROKES<br><br>• THE NUMBER OF CONVERSION (IN CASE OF A KANA-KANJI CONVERSION IN JAPANESE) |
| CHARACTER STRING | • THE NUMBER OF CHARACTERS (THE PROPERTY EASILY TYPED IN A NEARLY CONSTANT RHYTHM IS UTILIZED.) |
| VOICE | • THE NUMBER OF VOWELS (THE PROPERTY IN WHICH THE VOWEL IS EASILY PRONOUNCED IN A NEARLY CONSTANT RHYTHM IS UTILIZED.)<br><br>• SOME WORD ORDERS (SUCH AN 'PUT IT UP') ARE EASILY PRONOUNCED, AND OTHERS ARE NOT. |
| GRAMMER | • THE NUMBER OF SENTENCES FORMING WORDS (PARTICULARLY, THE NUMBER OF INDEPENDENT WORDS)<br><br>• THE PRONUNCIATION SPEED AND THE LENGTH OF A BREATH TIME ACCORDING TO THE MODIFYING RELATION BETWEEN WORDS OR PUNCTUATION OF A SENTENCE |
| CONTROL PROCEDURE | • TIME SEQUENCE OF CONTROL<br><br>• TIME LAG TAKEN FOR THE SWITCHING OPERATION WHEN DIFFERENT INTERFACES ARE SEQUENTIALLY SWITCHED |
| DEVICE TO BE CONTROLLED | • TIME DELAY CAUSED BY THE RESPONSE PERFORMANCE AND RECOGNITION PERFORMANCE (NORMALLY NECESSARY TO ADJUST FOR EACH DEVICE TO BE CONTROLLED) |

INPUT DEVICE, INPUTTING METHOD, INFORMATION PROCESSING SYSTEM, AND INPUT INFORMATION MANAGING METHOD

BACKGROUND OF THE INVENTION

1. Field of the Invention

The present invention relates to an input managing method when simultaneously using plural input means in information processing equipment. The present invention also relates to an input signal analyzing device utilizing the input managing method.

2. Description of Related Art

Conventionally, with respect to system operation processes, the natural language interface and voice input interface techniques are known, in addition to the well-known graphical user interface (GUI) technique. For example, in the natural language interface art, Tani et al. disclose that "a retrieval language SQL is created from an input conceptual dependency structure being a result of analysis of a Japanese sentence", in the paper entitled "A Natural Language Interface Development Kit: IF-Kit" (Technical Report of the Institute of Electronics, Information and Communication Engineers, NLC-91-62, Vol. 91, No. 534, PP. 25–32 (1992)). With respect to the voice input interface, Yamamoto et al. disclose that "Only an independent word is displayed on a menu. By freely using the independent word, the user can input phrase by phrase, which are connected to an arbitrary dependent word series, in voice" in the paper entitled "A Menu-Based Spoken Natural Language Input System" (Proceedings of the 47th Annual Convention, Information Processing Society of Japan, 3-167).

In the prior art, in order to operate a certain system, the operation instruction command is input through a single input system. For example, when the conventional natural language interface receives "Please tell me the telephone number of a hotel in the district A", an instruction for the corresponding database system is created. In this case, the input analysis is carried out on an input signal sent from a single interface, such as a keyboard. That is, the conventional natural language interface coexists with the GUI in the system. However, the input signals from both of the interfaces are not accepted or received simultaneously, and are not analyzed by taking each other into consideration. Moreover, in the conventional voice input interface, only one input entry is received and analyzed by selecting the GUI in the form for menu selection, or voice input device. However, the input signals from both interfaces are not accepted at the same time to analyze by taking each other into consideration them.

The object of the present invention is to provide an inputting method for specifying an input content by collecting plural pieces of input information being signals input from plural inputting means.

Another object of the present invention is to provide an input information managing method for specifying an input content by collecting input information being signals input from plural inputting means.

Still another object of the present invention is to provide an input device using the above-mentioned inputting method or input information managing method.

A further object of the present invention is to provide an information processing system including the above-mentioned input device.

SUMMARY OF THE INVENTION

In order to achieve the above mentioned objects, according to the present invention, the inputting method adds an input time for a piece of information to the input information, and then collects some pieces of information with input times close to one another, so as to specify an input content.

The input time need not be an actual time. However, identification information which can identify the input timing can be used as the input time. For example, in the information processing device, timing information which is represented with the clock pulses used therein can be handled as the input time. The information which gives an indication of the timing (sequence) of input information, even the time at which any device (or means) accepts the input information, can be used as the input time. For example, the input time is the time at which input information is input to the input device, or the time at which input information is input to the estimating means.

Moreover, according to the present invention, there is provided an input information managing method which manages plural pieces of input information accepted via plural input means, comprising the steps of recognizing an input time of the input information; obtaining a recognition result by dividing or merging the input information into the primitive analysis unit predetermined; estimating an input time of the recognition result using an estimating method predetermined for each inputting means; and collecting some of the recognition results whose estimated input times are close to one another, and then managing the collected information as a semantic analysis unit.

Furthermore, according to the present invention, input devices and information processing system using the above-mentioned methods are provided.

The input device or information processing system according to the present invention includes input time recognizing means, means for creating a recognition result using input information, input time estimating means, and means for producing a semantic analysis unit. Each of the above-mentioned means may include a portion implemented by a processor through execution of an instruction held in a storage region. However, the present invention should not be limited only to these methods of implementation. These means can be realized using hardware such as a dedicated circuit.

When at least one of the plural inputting means includes means for notifying a recognition result selecting section of input information and an input time of the input information, an input time recognizing means recognizes the notified time as an input time in a case where an input time is notified from the inputting means, and recognizes the time at which the input information has been accepted as an input time in a case where an input time is not notified. If the inputting means includes no input time notifying means, it is desirable that the input time recognizing means recognizes the time at which the input information notification is accepted as the input time of the input information.

The estimation of the input time, for example, can be performed based on the input time of the input information and a predetermined estimated input rate. The estimated input rate may be fixed for each of plural input means or for each of pieces of information. As the estimating method, a method of estimating an input time, based on input operation information, input signal amplitude information, information about the control means, and information about the device to be controlled, can be adopted.

For example, the plural inputting means may include a voice recognizer, a touch panel, a keyboard, a mouse, an eye tracker, a graphic recognizer, and the like. The inputting means may accept an input in a natural language. The input time of input information in a natural language can be estimated based on the time attribute of the natural language. For example, information about an input operation of the natural language, information about a character string, information regarding voice, information regarding grammar (such as information about morphemes and information about syntax), information regarding the control procedure for a device to be controlled, or information about the device to be controlled etc, can be used as the time attribute of the natural language. The primitive analysis unit of input information in the natural language is determined based on the paragraph, sentence, phrase, word, grammar (morphemes, syntax etc.), and phoneme of the input information.

FIG. 18 shows an example of the time attribute used for estimating the input time when a natural language is accepted. Even if input information is in a natural language, the input time of a recognition result after the dividing or merging of input information can be accurately estimated by using at least one of the attributes as an estimation criterion.

BRIEF DESCRIPTION OF THE DRAWINGS

FIG. 3 is a schematic diagram showing an example of an instruction information table according to an embodiment;

FIG. 4 is a schematic diagram showing an example of a control information table according to an embodiment of the present invention;

FIG. 18 is a table which lists examples of time attributes used for input time estimation when a natural language is accepted.

DESCRIPTION OF THE PREFERRED EMBODIMENTS

Figure 1:
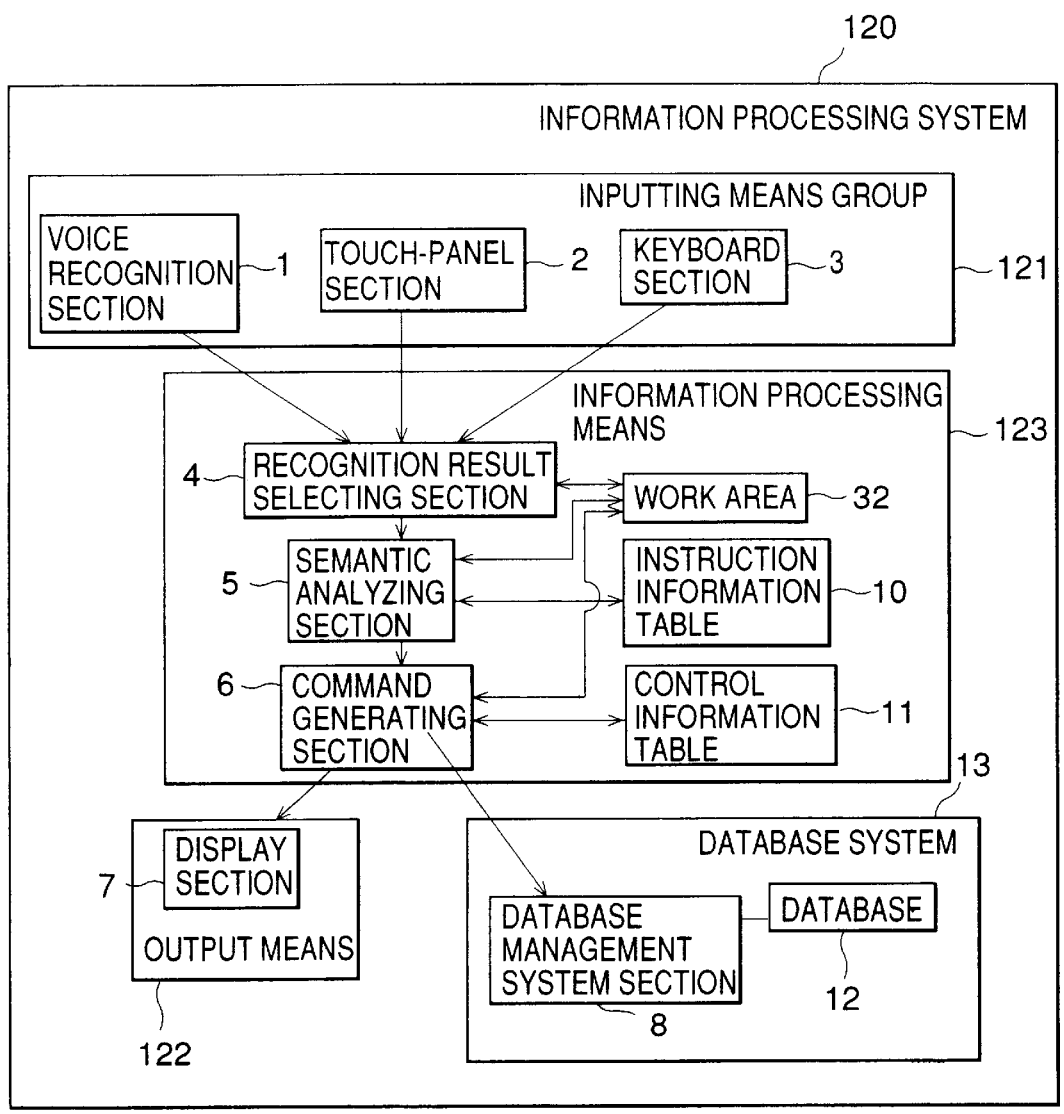
FIG. 1 is a functional block diagram of an information processing system according to an embodiment of the present invention.

According to the present invention, in order to extract a suitably combined recognition result from recognition results stored in a storage unit, a recognition result is stored together with time information thereof regarding the input time. When the recognition result is extracted, not only the information regarding an input device which receives the recognition result, but also the time information regarding each recognition result are considered, (e.g. plural pieces of time information whose input times are close to one another are collected). Thus, prior to the semantic analysis, the instruction information is temporarily stored into a storage device by a unit of the recognition result not necessarily restricted by the input time and the inputting means. Hence, the semantic analysis can be made by selectively collecting the recognition results from the storage device. Even if users asynchronously input operation instructions using plural inputting means, the synergistic or complementary function of the plural operation instructions can be semantically analyzed.

In the use of the input device according to the present invention, a user can arbitrarily provide an operation instruction to an input device or information processing system including plural interfaces, asynchronously (or synchronously), so to speak, as he pleases, without being conscious of the exclusive selectivity in time. Particularly, when using a natural language (such as English, Japanese, or the like) used daily and a GUI using a mouse or icons, the input operation can be made at a natural timing with a combination of them. For example, if an operation instruction is input, a user can arbitrarily input operation instructions without being bounded by a language format and input procedure. Hence, even a user unfamiliar with a formal language (specially-formed commands determined for computers) can freely operate the devices to be controlled.

As described above, when plural pieces of information are input via plural inputting means, the system according to the present invention can properly operate devices to be controlled, by suitably considering the relationship between plural input operation instructions. That is, according to the present invention, even if the meaning of information input via each of plural inputting means is imperfect or insufficient, the device to be controlled can be suitably controlled by performing a semantic analysis to mutually complement the contents of the plural input operation instructions.

As described above, according to the present invention, a remarkable effect can be obtained such that even if a user simultaneously (or respectively) uses plural interfaces, the input content can be specified by analyzing a combination of the contents of the input operation indications.

Moreover, according to the present invention, even if a recognition result from the input and recognition device is subjected to batch processing, the collation accuracy can be improved with respect to a recognition result from another input and recognition device by dividing the recognition result and then adding (or amending) a suitable input time to each of the divided recognition results, based on the mode thereof.

EXAMPLE

An embodiment of the present invention will be explained below by referring to the attached drawings.

In this embodiment, the present invention is applied to the input of an operation instruction such as outputting or database retrieval/updating in an information processing system including a voice recognizer, a touch panel, a keyboard, a display, and a database system. In the present embodiment, the display and the database system are called a device to be controlled.

In the case where the present embodiment is not applied, the means for extracting data from a database system respectively handles the input signals input via the inputting means, such as voice inputting means, touch-panel inputting means, keyboard inputting means, and the like. It is predetermined whether the input signal is accepted via a specific one of the above-mentioned inputting means according to the kind of information accepted. Hence, in order to input data and commands, a user must change the plural inputting means in a predetermined order. In the case where a system which is programmed to automatically switch between plural inputting means, a user must intentionally change the inputting method (such as voice, manual operation, or the like) according to the automatic switching of the inputting means.

According to the present embodiment, a user's operation instruction refers to an instruction represented with a natural language sentence input through voice or an indication represented by touching a predetermined region on a touch panel. For example, this operation instruction includes the inputting in which a position (e.g. the X-coordinate 12 and the Y-coordinate 23) of the touch panel is touched with a finger while "detail this" is pronounced.

A. Information processing system configuration (1) Hardware configuration

Figure 2:
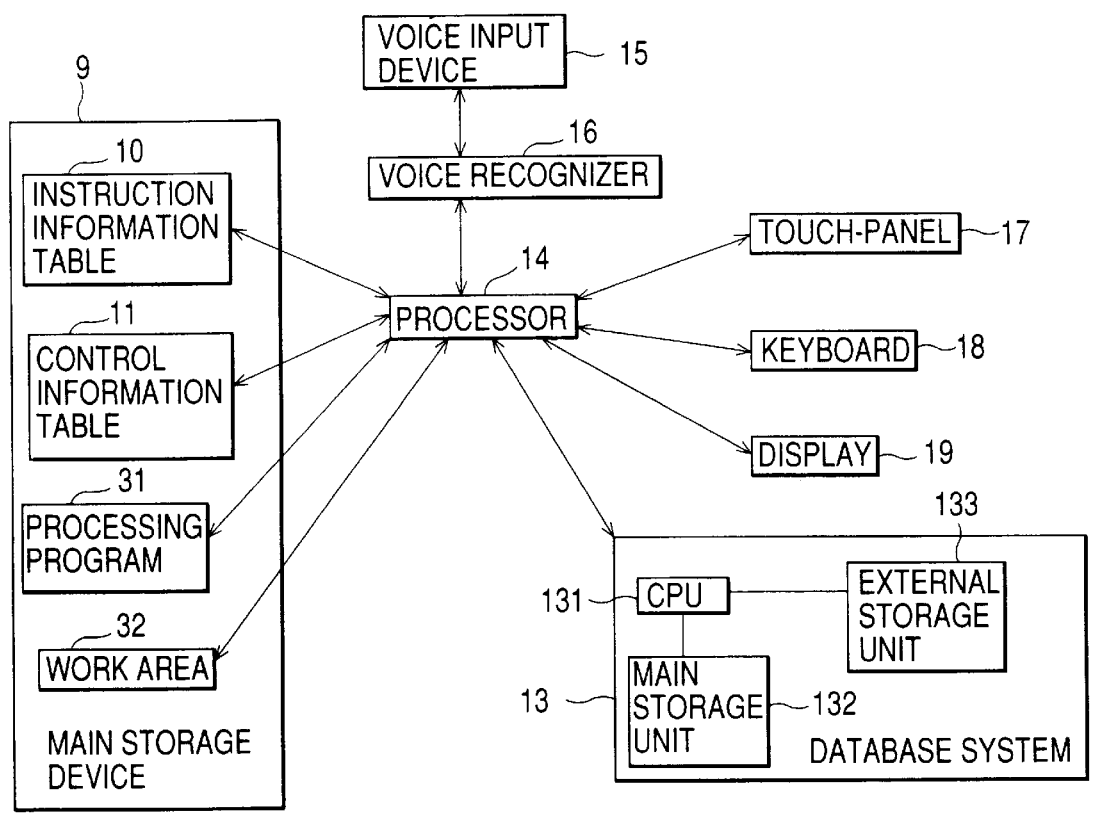
FIG. 2 is a diagram showing the a hardware configuration according to an embodiment of the present invention.

FIG. 2 shows the hardware configuration of the information processing system 120 according to the present embodiment. According to the present embodiment, the information processing system 120 includes a processor 14, a main storage device 9 connected to the processor 14, a voice recognizer 16, a touch-panel 17, a keyboard 18, a display 19, a database system 13, and a voice input device 15 connected to the voice recognizer 16. According to the present invention, if an information processing system which executes an instruction held in the main storage device 9 is used, the hardware including the main storage device 9 and the processor 14 may be a work station, personal computer, or personal digital assistant (PDA), without being limited to a main frame.

Signal lines connect the devices 9, and 13 to 19. The signal lines can be realized with either wiring or radio. In this embodiment, the devices are connected via a communication modem and communication lines. The communication modem, the communication lines, or the protocol necessary for them can be realized by using a well-known technique. Hence, the detailed explanation thereof is omitted in the present specification.

The database system 13, being an information processing system, includes a main storage unit 132, a central processing unit (CPU) 131, and an external storage unit 133. The external storage unit 133 stores database information. The CPU 131 executes an instruction previously held in the main storage unit 132. Thus a database management system that manages database information held in the external storage unit 133 is implemented. Instead of holding database information in the database management unit 133 included in the database system 13, the database information may be held by directly connecting an external storage unit to the processor 14. Furthermore, instead of the whole or part of the database management system, the processor 14 may execute the database management program held in the main storage device 9.

The voice input device 15 and the voice recognizer 16 may be combined as a single device. In this embodiment, a microphone is used as the voice input device 15. Another device, such as a telephone terminal may be used as the voice input unit. Moreover, instead of the whole or a part of the voice recognizer 16, the processor 14 may execute the voice recognition program held in the main storage device 9.

In this embodiment, the voice input device 15, touch-panel 17, and keyboard 18 are used as an input apparatus. A character recognizer, mouse, natural language front-end processor or the like can be used as another input apparatus.

In this embodiment, the device to be controlled corresponds to the display 19 and the database system 13. In addition, a printer, a VTR (video-tape recorder), voice synthesizer, a decision support system, an expert system, an operating system, a schedule management system, an address management system, a game system, a navigation system, or the like, can be connected as the device to be controlled.

The main storage device 9, being a storage unit, includes a memory area 31 for a process program being an instruction group related to an analysis for an operation instruction, a work area 32 being a temporary storage area used in execution of the process program, an instruction information table 10, and a control information table 11.

The processor 14 is an arithmetic processing unit that interprets and executes an instruction held in the process program storage area 31 of the main storage device 9. The processor 14 of the present embodiment can execute plural tasks in parallel with time sharing.

(2) Functional configuration

FIG. 1 shows the functional block diagram of the information processing system 120 according to the present embodiment.

The information processing system 120 of the present embodiment, as shown in FIG. 1, includes an inputting means group 121, an output means 122, an information processing means 123, and a database system 13. The information processing system 123 includes a recognition result selecting section 4, a semantic analyzing section 5, a command generating section 6, an instruction information table 10, a control information table 11, a work area 32, and an application software executing means (not shown).

a. Input means

The input means group 121 consists of plural inputting means, each of which accepts an input and then produces the result, and the time at which the inputting is accepted (input time (hereinafter referred to as a time stamp)), to the recognition result selecting section 4. The inputting means group 121 includes the voice recognition section 1, the touch-panel section 2, and the keyboard section 3, as inputting means.

The voice recognition section 1 is realized using a voice input device 15 and a voice recognizer 16. The voice input device 15 accepts the voice input via a microphone and then reports it to the voice recognizer 16. The voice recognizer 16 converts the report voice signal into a signal string and then produces the result, as well as the input time stamp, to the recognition result selecting section 4.

The touch-panel section 2 is formed of a touch-panel 17 and a contact signal processing section (not shown) that extracts initial point information, end point information, and course information when the touch-panel 17 is touched, and then produces the result and the input time stamp thereof to the recognition result selecting section 4. The contact signal processing section is implemented by the processor 14 executing instructions held in the process program storage area 31.

The keyboard section 3 consists of the keyboard 18 and a key operation signal processing section (not shown) that detects a key of the keyboard 18 being pressed and then produces the result and the input time stamp to the recognition result selecting section 4. The key operation signal processing section is implemented by the processor 14 that executes instructions held in the process program storage area 31.

When an input means with no function of accurately recognizing the detected input time is used, the time at which each recognition result is output or the time at which the recognition result selecting section 4 accepts the recognition result, can be substituted for the time stamp. When the time stamp of each of the recognition results cannot be obtained, a set of certain recognition results can be grouped with the same time. In this case, it is desirable to correct the time stamp using the recognition result selecting section 4. This correcting method will be described later.

Any inputting means which accepts input and then provides the content can be used in this embodiment. That is, any voice recognizers, touch-panels, and keyboards which are commercially available can be used without any change or by improving them somewhat. Here, detailed explanation of the mechanism of each of the input unit and recognition unit is omitted. In the present invention, it is more efficient to use each input unit and recognition unit in parallel and concurrently. However, they can be used exclusively and selectively.

b. Object to be controlled

In the present embodiment, the command generating section 6 in the information processing means 123 issues instructions (commands) according to the operation instruction accepted via the input means group 121 to operate the display 19 and/or database system 13 being a device to be controlled.

The output means 122 has a display section 7 that displays information according to a display command from the command generating section 6. The display section 7 consists of a display 19 and an image display section (not shown) that outputs on the display 19 the information which requested by the command generating section 6. The image displaying section is implemented by executing instructions held in the process program storage area 31 with the processor 14. Since the process in which the image display section displays what is specified by the display command on the display 19 can be sufficiently realized by using the well-known art, a detailed explanation is omitted here. Other means, such as printers, can be used as the output means.

The database system 13 includes the database management system section 8 and the database 12. As described above, the database 12 is a storage area arranged in the external storage unit 133 in the database system 13. The database management system section 8 is implemented by executing the instructions previously held in the main storage unit 132 in the database system 13 by means of the CPU 131. The database system 13 updates and retrieves data held in the database 12 according to the instruction from the command generating section 6. Since the data structure of the database 12 and the process of the database system 13 are realized using the well-known art, the detailed explanation will be omitted here.

c. Information processing means 123

In the information processing means 123, the recognition result selecting section 4, the semantic analyzing section 5, the command generating section 6, and the application software executing means (not shown) can be implemented by the processor 14 which executes the instructions held in the process program storage area 31.

In the present embodiment, the recognition result selecting section 4, the semantic analyzing section 5, the command generating section 6, and the application software executing means can be respectively implemented by executing the instructions using the processor 14 operable on a time sharing basis. Each of the sections 4 to 6 and the application software executing means may be implemented using an independent program. The whole information processing means 123 can be implemented by executing a single program using the multi-processing (multi-tasking) method. Each of the units 4 to 6 can be implemented as a process included within the program.

In the present embodiment, the single processor 14 executes the instructions for each of the sections 4 to 6. However, each of the sections 4 to 6 can be implemented with a respective computer in a distributed system including plural computers. In this case, the computers may be connected mutually and functionally via storage media.

Each of the instruction information table 10, the control information table 11, and the work area 32 corresponds to a storage area arranged in the main storage device 9. If the work area 32, the instruction information table 10, and the control information table 11 can be stored and read out, the storage areas can be dispersed by arranging plural storage devices without arranging the areas in the same storage device.

In the present embodiment, each of the tables 10 and 11 is represented in the form of an array. For example, the table can be implemented in other data configuration such as a semantic database.

The recognition result selecting section 4 manages a pair (hereinafter, referred to as recognition information) of the recognition result and time stamp reported from the inputting means group 121, collects the pairs into groups (hereinafter, referred to as semantic analysis unit) and then reports each group to the semantic analyzing section 5. Each group is formed of a single piece or plural pieces of recognition information (a pair of the recognition result and the time stamp).

In order to construct the device cheaply or for high-speed processing, it may be considered that the present invention is embodied in the structure with no recognition result selecting section 4. The reason for this is that the recognition result selecting section 4 can be eliminated, by recognizing each piece of recognition information as a semantic analysis unit, without collecting plural pieces of recognition information. However, it is desirable that the system which handles the recognition result in parallel and simultaneously to perform a complex analysis operation such as natural language processing includes the recognition result selecting section 4. Previously collecting recognition information allows the processing burden on the semantic analyzing section 5 to be relieved.

The semantic analyzing section 5 accepts a semantic analysis unit reported from the recognition result selecting section 4, analyzes the semantics according to the information held in the instruction information table 10, and then outputs the semantic analysis result being instruction information related to the control to the command generating section 6.

The command generating section 6 accepts a semantic analysis result reported from the semantic analyzing section 5, generates a signal controlling the devices 7 and 13 to be controlled based on the information held in the control information table 11, and then outputs the control signal to the display section 7 or the database management system section 8. The case where the control signal output from the command generating section 6 is a sequence of character codes (hereinafter referred to as a command character string) will be explained below for easy understanding. This premise is applicable to control signals of different types. For example, if the control system is one where the control signal converts the character string in one-to-one correspondence (or many-for-one correspondence), a signal conversion process is inserted between the command generating section 6 and the device to be controlled.

The instruction information table 10 is a correspondence table that compares the semantic analysis unit with the corresponding operation instruction content. The control information table 11 is a correspondence table that constructs the operation instruction content with the command character string. These tables will be explained in detail later. In either table, multi-stage conversion, instead of signal stage conversion, may be needed to perform a highly functional semantic analysis and command generation. In this case, the table may be prepared for each stage. When the analysis is performed as a simple operation instruction or an operation instruction in a limited operation condition, the single stage conversion is performed as shown in the present embodiment.

The function corresponding to a sophisticated semantic analysis including the step of identifying plural recognition results with an operation object model inside the computer, or compensating information not explicitly obtained from the recognition results, corresponds substantially to utilizing the instruction information table 10 in a multiple stage. For example, the algorithm which obtains a semantic representation using a diffusing search over a semantic network having a specific structure, such as a chained functions structure, can be realized by:

describing a diffusing source node, and the attribute or condition of a link connected to the node as a semantic analysis unit; and describing the diffusing destination node as a content of the operation instruction in the instruction information table 10, using the variable description or function description so as to suitably propagate information; and re-using the instruction information table 10 by arranging the diffusing destination node as diffusing source node. Thus the diffusing search algorithm can be realized.

The application software executing means is means for processing data and then executing the application software (e.g. a graphic display software, text calculating software, wordprocessor, software of a type called spreadsheet, and the like) to output the result to the display section 7. The application software executing means may be arranged in the display section 7. If no graphic display is needed, then consequently no application software executing means is required.

B. Data configuration (1) Instruction information table 10

FIG. 3 schematically shows the concrete example of the instruction information table 10 in the present embodiment. The instruction information table 10 is a table including a storage area 20 previously holding information showing semantic analysis units and a storage area 21 holding information showing an operation instruction content.

Specifically, the semantic analysis unit storage area 20 previously holds a mass of recognition information (the semantic analysis unit) being a pair of the recognition result and the time stamp. The operation instruction content storage area 21 holds an item and the value thereof (or a method for finding a value (such as function)) necessary for preparing commands corresponding to the semantic analysis units by command generation section 6. The item includes an operation instruction function, operation instruction condition, and operation instruction object, corresponding to the recognition information, and the like. The operation instruction content storage area 21 may lack in part of items or the value thereof, or have plural items and the values thereof.

The algorithm which gradually converts a semantic analysis unit into an operation instruction content by using the instruction information table 10 a plural number of times is used, and the semantic analysis unit storage area 20 and the operation instruction content storage area 21 may hold the recognition results, time stamps, operation instruction functions, and the like, in a mixed manner. The reason for this is that the purpose of the instruction information table 10 is to provide information for converting a semantic analysis result into an operation instruction content in the semantic analyzing section 5. In addition to the example shown in FIG. 3, various modifications may be considered according to a data format or information or a marker temporarily added (or propagated) during the conversion. For brevity of the explanation, it is assumed in this embodiment that the instruction information table 10 consists of a semantic analysis unit held in the semantic analysis unit storage area 20 and the operation instruction content corresponding to the semantic analysis unit (held in the operation instruction content storage area 21 on the same line).

The instruction information table 10 shown in FIG. 3 holds a semantic analysis unit formed of two pieces of recognition information being a pair of a voice recognition result, "detail this", and the time stamp thereof' "14 (Hr.): 25 (Min.): 33 (Sec.)" plus a pair of recognition result via a touch-panel "(12 (X-coordinate), 23 (Y-coordinate))" and the time stamp thereof, "14 (Hr.): 25 (Min.): 34 (Sec.)" in the first line in the semantic analysis unit storage area 20. In the same line, the operation instruction content storage area 21 stores the operation instruction contents formed of the operation instruction function "display", the operation condition "detail", and the operation object "WORK_TABLE_2 (the name of an identifier)", corresponding to the two pieces of recognition information. It is desirable that these corresponding relationships are previously prepared.

A concrete value (such as (12, 13)) may be stored as the semantic analysis unit to be stored. These values may be described as free variables or variables having domains. In order to add a relative limitation with respect to the value of another pair in the semantic analysis unit 20 using these variables, an expression (e.g. T<S+4) may be described additionally or the value (e.g. "WORK_TABLE_2") to be described to the operation instruction content 21 may be described as a function using the variables.

For example, the variable X may be described instead of "12 (X-coordinate)" and the variable Y may be described instead of "23 (Y-coordinate) in the semantic analysis unit. The function table_ID(X,Y) (where the variable X and variable Y are respectively arguments, and the function returns the identifier name of a table (e.g. a table at the coordinate (X,Y) as a returned value) may be described instead of the operation object "WORK_TABLE_2" in the operation instruction content 21. In this case, although the process of referring to the instruction information table 10 requires interpreting variables and functions, in addition to a simple character string collation to each item in the instruction information table 10, it can sometimes significantly reduce the amount of data to be described in the instruction information table 10. When carrying out this referring, the art of distinguishing or collating token, such as numerals, variables, or functions (e.g. matching numeral "12" with a variable X), and then dealing with countermeasures (e.g. allocating numeral "12" to a variable X) and the art of applying an actual process program based on the function description and then returning a value as the result can partially or wholly utilize well-known techniques, such as an interpreter or a compiler. Hence the detailed operation will not be explained here.

The concrete example of making full use of the variables, expressions, and functions is shown as the second record (held in the second line) in FIG. 3. In the second line, the semantic analysis unit storage area 20 holds the semantic analysis unit consisting of three pieces of recognition information: a pair of the voice recognition results "detail" and the time stamp "variable T, where T<S+4" thereof, a pair of the voice recognition results "this" and the time stamp "variable S" thereof, and a pair of the touch-panel recognition results "(variable X, variable Y)" and the time stamp "variable U, where |U-T|<2" thereof. In this unit, the operation instruction content storage area 21 on the second line previously stores an operation instruction content consisting of an operation instruction function "display", an operation condition "detail", and an operation object "table_ID (X,Y)". As described above, with a value which is difficult to previously determine, or a value which does not require strict matching (e.g. an input time of "14(H): 25(M): 33(S)", the use of the variables, limited expressions, and functions allows a predetermined semantic analysis unit and an operation instruction content to be described in the instruction information table 10. Hereinafter, the "matching" may be expressed as "coincidence".

Here, the description or process can be easily made by adding a sign (e.g. "@" shown in FIG. 3) in front of a variable or function described to explicitly distinguish it from other descriptions. It is not indispensable to add such a sign.

(2) Control information table 11

FIG. 4 schematically shows a concrete example of the control information table 11 according to the present embodiment. The control information table 11 is a table having the operation instruction content storage area 22 and the command character string storage area 23 for each operation instruction.

The purpose of the control information table 11 is to provide information necessary for converting the operation instruction content into the command character string in the command generating section 6. Hence, various modifications can be considered by selecting a data format or temporarily adding (or propagating) information or a marker, during the conversion. In the brief explanation of this embodiment, it is assumed that the control information table 11 includes the operation instruction content storage area 22 and the command character string storage area 23, as shown in FIG. 4.

In the explanation of a concrete example of the first record (record held in the first line) illustrated in FIG. 4, the operation instruction content of the first record (or information held in the operation instruction content storage area 22) is described with the operation instruction function "display", the operation condition "detail", and the operation object "@A". The command character string storage area 23 on the first line holds the command character string of "Display-detail @A" corresponding to the description of 22.

Each item in the control information table 11 may be described so as to include variables or functions similar to those in the instruction information table 10. In this case, the command character string 23 is specially called "command template".

When the processing method is a simple converting process in which the semantic analyzing section 5 refers to the instruction information table 10 and the command generating section 6 refers to the control information table 11, the two tables may be collected together as a single table by regarding the information held in the operation instruction content storage area 21 listed in the control information table 11 to be the same as the information held in the operation instruction content storage area 22 listed in the control information table 11 (by taking care of the possible combination of the same items). However, the case where a different semantic analysis unit usually corresponds to the same operation instruction content is often seen in the instruction information table 10. Hence it is not always effective to group plural tables together as a single table, in view of the consumption of storage resources.

For convenience of the explanation, the operation instruction content and the description of the operation instruction content are described using a readable character string. However, since the main purpose of the present embodiment is established by processing inside a computer, the description may be a mere identifying code such as "A001", or a pointer showing the location of a storage resource.

C. Process content (1) Process of the recognition result selecting section 4

Figure 5:
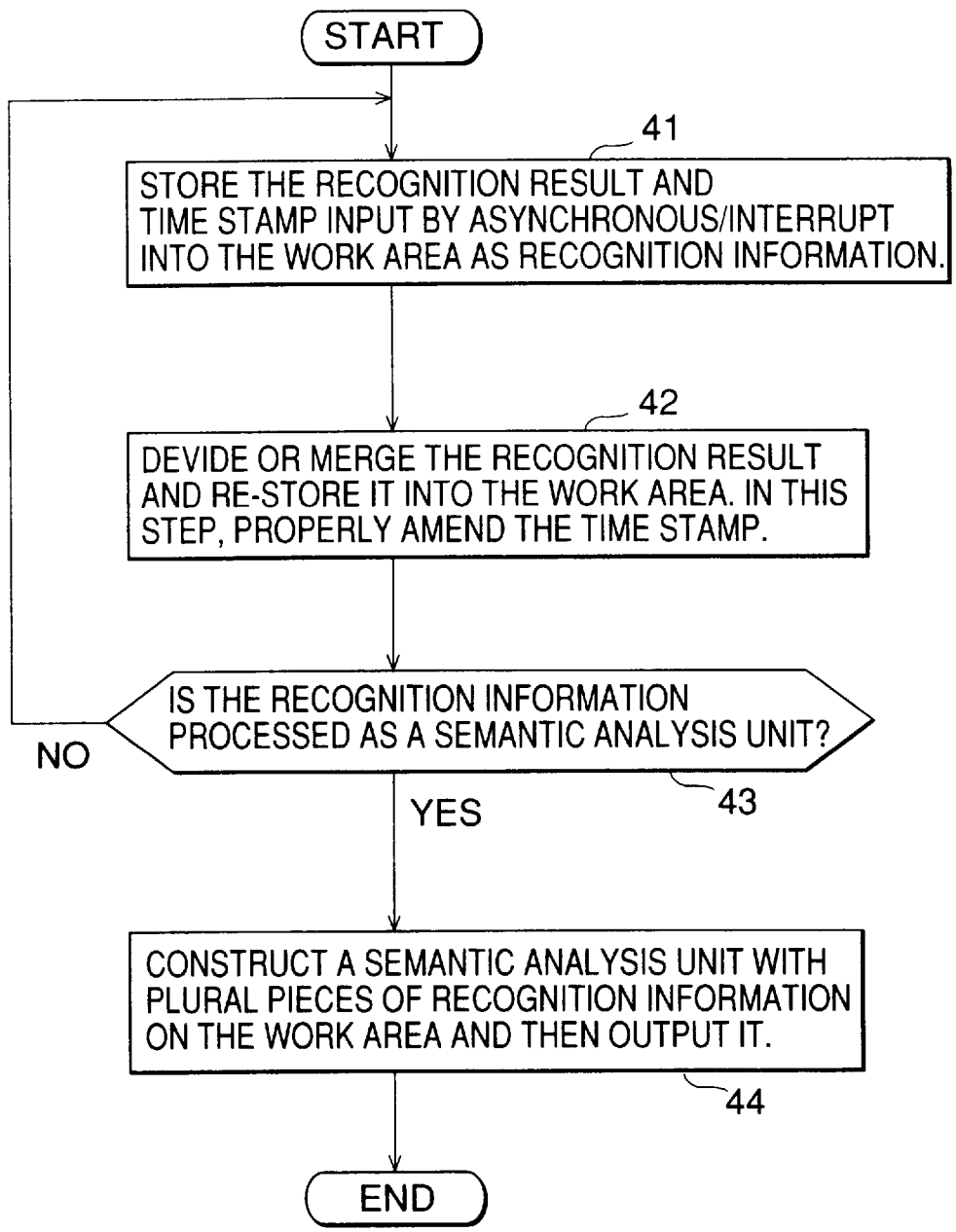
FIG. 5 is a flowchart showing an outline of the process of a recognition result selecting section according to an embodiment of the present invention.

In the analyzing system 120 according to the present embodiment, when the inputting means group accepts inputting, the recognition result selecting section 4 in the information processing means 123 receives the accepted input information and the time stamp, and it is started up. FIG. 5 shows roughly the process of the recognition result selecting section 4 according to the present embodiment.

(1-1) Step 41

The recognition result selecting section 4, which accepts a report on recognition information, pairs the recognition result (input information) and the time stamp output from each inputting means, and then stores the result in the work area 32 (step 41). If each of the input means 1 to 3 has no means that reports the time stamp in the recognition result outputting operation, the recognition result selecting section 4 may add the time at which the report from the inputting means is accepted to the recognition result reported as a time stamp to create a pair of recognition information item.

The plural inputting means issue reports asynchronously. In step 41, it is desirable that the entry can occasionally be accepted even during the execution of another process. In the present embodiment, when recognition information is reported from each input means, an interrupting process occurs in the recognition result selecting section 4. In this interrupt process, the recognition result selecting section 4 stores the accepted recognition information in a buffer area (not shown) being a storage area previously allocated in the main storage device 9. In the execution in the step 41, the recognition result selecting section 4 extracts as a process object one piece of unprocessed recognition information stored in the buffer area. Thus, in the present embodiment, reports from plural inputting means are occasionally accepted and then sequentially processed.

(1-2) Step 42

Next, the recognition result selecting section 4 divides or merges the recognition results among recognition information (pairs of a recognition result and the time stamp thereof) held in the work area 32 using a predetermined method, removes the original recognition result from the work area 32, estimates, if necessary, the time stamp of a new recognition result created by the dividing operation using a predetermined estimating method, and then again stores the new recognition result and the time stamp as recognition information in the work area 32. This process is repeated until no dividable or combinable recognition result is found in the work area 32 (step 42).

The time stamp to be paired with the divided recognition result may have the same value as that of the time stamp included in the recognition information prior to the dividing operation. However, in order to accurately process the new recognition result after the dividing operation, it is desirable that the time stamp has a newly estimated value based on the time stamp of the recognition information prior to the dividing operation and the aspect of the recognition result.

A method which divides or merges the recognition result after processing, to convert it into a single phrase using the morpheme analysis and syntactical analysis when a recognition result is a natural language sentence, is previously prepared as a predetermined dividing and combining method. The Japanese analyzing process or English analyzing process well-known by persons skilled in the art may be used as the morphological analysis or syntactical analysis.

For example, with the recognition result of "de" and the recognition result of "tail" held in the work area 32, the recognition result selecting section 4 combines them to "detail" using the dividing and merging method. In the recognition result after the merging operation, the later one of both the time stamps "de" and "tail" is given as a time stamp. Hence the recognition information including the recognition result of "de" as well as the recognition result including the recognition result of "tail" are deleted from the work area 32. Then the recognition information in which the time stamp "tail" is given to the recognition result of "detail" is stored in the work area 32 as an estimated time stamp.

For example, when the recognition result is "detail this", it is divided into "detail" and "this" using the dividing and merging method mentioned above. Hence, the recognition information including the recognition result of "detail this" is deleted from the work area 32. The recognition information in which an estimated time stamp is given to the recognition result of "detail" as well as the recognition information in which the time stamp of "detail this" is given to the recognition result of "this" as an estimated time stamp are stored in the work area 32.

As other dividing and merging methods, these are a method of individually dividing image data of characters which are input through an image scanner at a time, or merging them to a phrase, a method of dividing or merging data to form a vocalization group using a change in the stress of a voice signal, dividing the continuous operation with a keyboard or touch-panel (the move operation following a double clicking) into unit operations, a method of dividing or merging according to the displacement of the continuously varying information, and the like.

Without limiting to a method of time-dividing of data from the input device in partial order, the concurrent signals may be divided. For example, when voice, sound (e.g. applause, striking noises), and music, are simultaneously input to a microphone, they may be divided (or extracted) into different recognition results. Moreover, when a television camera is used as an input device, an item of image data may be respectively divided (or extracted) into a person's expression data and a person's movement data.

According to the method of estimating the time stamp corresponding to a recognition result after the dividing operation, the estimation is made based on at least either the original time stamp or information obtained from the aspect of the original recognition result. In the present embodiment, there is a method of previously estimating the character input rate and then estimating the input end time of a recognition result newly created through the dividing operation by referring to the input end time of a recognition result prior to the dividing operation (the time stamp of recognition information prior to the dividing operation), based on the estimated input rate (two characters per second in this embodiment).

If it is assumed that the estimated input rate is, for example, two characters per second, one character of the recognition result is converted into a half second. In the explanation of the case where the estimating method is used, following the above-mentioned example, it is estimated that the value of the time stamp corresponding to the recognition result "detail" is the value just before 2 seconds from the value of the original time stamp, that is, "14(H): 25(M): 31(S)", based on the information obtained from the original time stamp (14(H): 25(M): 33(S) in this embodiment) and the information obtained from the mode of the original recognition result (e.g. the information that the number of characters for "this" is four).

Where the input means is a voice recognition unit, keyboard, hand-written character inputting device, or the like, the method of estimating the time stamp after the dividing operation based on the number of phonemes forming the original recognition result, the key-touching count number, the number of character strokes, or the like (or by using plural constituent elements) may be used as another time stamping method.

The minimum unit of the recognition result division corresponds to the content previously held in the semantic analysis unit storage area 20 included in the instruction information table 10. In the explanation of this embodiment, the minimum unit of the character string or voice of a natural language is roughly a phrase and the minimum unit of the position information from the touch-panel is the coordinate (e.g. a pair of the X-coordinate and the Y-coordinate). Other units (such as pronunciation symbol, presence of space, 2-byte code, sentence, and pointing course) can be applied to this embodiment.

As described above, estimating the time stamp of each portion of a recognition result allows the accuracy of the collation identification to be improved when the recognition results from plural input means indicate the same operation object. In other words, in the current example, it is considered that the operation object of "this" indicates data around the coordinate (12, 23), based on the time "14(H): 25(M): 34(S)" at which time the touch-panel was touched, and the estimated time stamp "14(H):25(M):33(S)" for "this".

Let us consider "this here" as the example where it is difficult in the prior art to accurately recognize an inputting operation. When the input result is not divided, it is difficult to accurately collate the information corresponding to "this" and the information corresponding to "here" with the recognition information obtained by other input means, respectively.

However, in this embodiment, the recognition result (input information) the inputting of which is accepted, or "this here", is divided while the time stamps are each suitably corrected are added respectively to the recognition results, or "this" and "here", newly created through the dividing operation. Hence the recognition results can be accurately collated with the recognition result obtained from other input means as the information indicated with "this" and the information indicated with "here".

In this embodiment, the recognition result dividing step and input time estimating step each described above are carried out for any recognition results from the input means 1 to 3. For example, the recognition result selecting section 4 estimates and gives the time stamp of each of the coordinates along the touch course (e.g. coordinate columns of (12, 23), (13, 25), and (14, 28)) on the touch-panel 17, in the recognition result accepted by the touch-panel section 2. Thus, the coordinate corresponding to "this" as well as the coordinate corresponding to "here" can be suitably determined.

Moreover, when the recognition result from the inputting means can be divided into plural smaller recognition results without losing the ordering, it is desirable that the time stamp is allocated in view of the ordering. Particularly, the subdivided recognition results can be easily collated with respect to each other by giving the time stamp to plural recognition results respectively obtained from plural inputting means in view of the order. When plural subdivided input data arranged in the order of time have a strong time-dependent tendency, the tendency is called a "non-crossing property". In the inputting example where the non-crossing property is reflected effectively, "this and this" is input in voice and a course is input by pointing the coordinate (12, 23) with a finger and then indicating the coordinate (13, 25). In this case, the semantic analyzing section 5 in the rear stage can easily process the first half portion and the last half portion as the same object by determining (or correcting) the time stamp such that the first half portion of the voice, "this", is time-stamped earlier than that of the last half portion thereof, "this", and that the coordinate (12, 23) is time-stamped earlier than that of the coordinate (13, 25).

(1-3) Step 43

Next, the recognition result selecting section 4 judges whether the recognition information stored in the work area 32 should be processed as a semantic analysis unit based on a predetermined criterion (step 43). If it judged that the recognition information is processed as a semantic analysis unit, the recognition result selecting section 4 leads the process to step 44. If this is not the case, the process is returned to the step 41.

This criterion, specifically, includes the event that a predetermined amount of data has been stored in the work area 32, the event that a recognition result from an input means has arrived (or stopped), the event that a predetermined time (e.g. 5 seconds as an execution time) has passed since the inputting was stopped, the event that a specific key (such as a return key) has been depressed, or the combinational event thereof. With the occurrence of the event, the recognition result selecting section 4 executes the processes following step 44.

In order to realize the event as a program, the event drive signal (for mouse clicking, or the like) generally used for window systems may be used or assembled without any change. It is not necessary to specially design the event. Step 42 may be executed after step 43.

(1-4) Step 44

Next, the recognition result selecting section 4 collects the recognition information held in the work area 32 for each of the semantic analysis units and then supplies the content to the semantic analyzing section 5 (step 44).

The semantic analysis unit may be formed of only a single piece of recognition information. In the collecting criterion, for example, where the time stamp of each recognition information has the same value or the difference between the time stamps is within a predetermined value (e.g. 5 seconds), each recognition information is handled as the same semantic analysis unit. Otherwise, after the candidate in a group to be selected is proposed to a user, the information is converted into a semantic analysis unit according to a selection instruction from the user. Otherwise, plural pieces of information output from the same input means are used as the same semantic analysis unit. Otherwise, the criterion in which the above-mentioned criteria are merged is used as a semantic analysis unit.

The remaining semantic analysis units may be ignored every time one semantic analysis unit is output. The next semantic analysis unit may be obtained by again returning the remaining semantic analysis units to a pair of the recognition result and the time stamp, restoring the result into the work area 32, and then re-executing from the step 41. In the case of the reuse, a pair of a new recognition result and the time stamp thereof, each which arrives in the process of steps 42 to 44 and is then stored in the work area 32 may be merged. In this case, there is an advantage in that even if the interrupt of the timer which counts the elapsed time (5 seconds in the above-mentioned embodiment) in step 43 branches to step 44 before another pair to be combined is accepted, the recognition result is again returned to the work area 32, so that a semantic analysis unit can be constructed with the pair arriving late. The recognition result within the work area 32 may be operated (or modified) according to the condition of the changed system.

(2) Process of the semantic analyzing section 5

Figure 6:
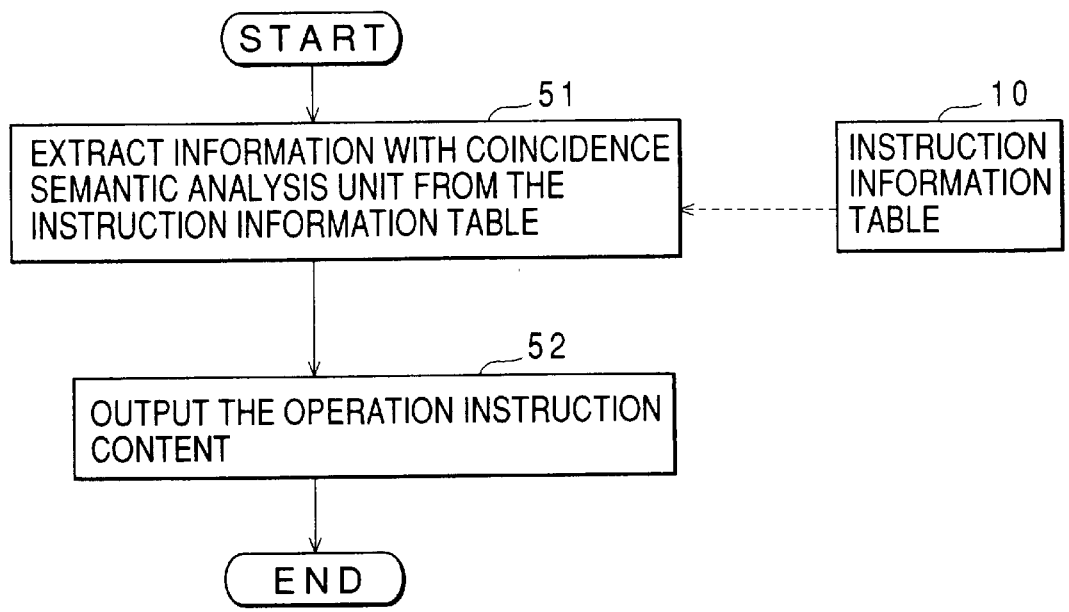
FIG. 6 is a flowchart showing an outline of the process of a semantic analyzing section according to an embodiment of the present invention.

FIG. 6 shows the outline of the process of the semantic analyzing section 5 according to the present embodiment. When the recognition result selecting section 4 reports information on a semantic analysis unit in the step 44, the semantic analyzing section 5 is started up.

(2-1) Step 51

The semantic analyzing section 5 first selects at least one record in which semantic analysis units held in the semantic analysis unit storage area 20 wholly or partially coincide with the semantic analysis unit reported from the recognition result selecting section 4 or related thereto among records (consisting of a semantic analysis unit and an operation instruction content) of the instruction information table 10, and then decides which of them has the highest priority (step 51). If a part of the semantic analysis units is coincident, another semantic analysis unit may be repeatedly retrieved to coincide with the remaining parts that are not coincident.

The coincidence algorithm may simply check whether the description of the semantic analysis unit coincides with the character string. In a more complicated case, where a variable description, macro description (alias description), coincidence range description, or function description is performed in the instruction information table 10, it is necessary to prepare a suitable knowledge according to the description, and to analyze the variable description or macro description before the coincidence is checked in step 51 (or sequentially according to step 51).

However, the function usually used in well-known interpreters serves for the knowledge or analysis about the description. For example, numeral "12" can coincide with the variable description "@X"; the character string "this" can coincide with the macro description "@ proximal relationship"; numeral "23" (placed between the coincidence range descriptions) can coincide with the coincidence range description "@20 to @30"; and the character string "August 26" (accordance to an actual today's date) can coincide with the functional description "@ today". The semantic analyzing section 5 is sufficiently to determine these coincide. In the description, the symbol "@" is added to distinguish the variable description and the macro description. In an actual process, another symbol (or syntax) may or may not be added.

In this embodiment, for the coincidence or relationship degree, priority is added to the candidate of a semantic analysis result's solution by grading according to the coincidence or relation degree. If plural respondent candidates exist, the reliability of the semantic analysis result can be improved by adding to this embodiment the step of inquiring (confirming or selectively accepting) as to whether the answer from an outsider (user) is fight or wrong, based on the priority.

Furthermore, item of a limitation which lies between plural pieces of recognition information included in the semantic analysis unit may be added to the description held in the semantic analysis unit storage area 20. For example, the presence of coincidence or the degree of coincidence may be judged by describing the limitation such as either the relational expression corresponding to "the interval between time stamps being within 5 seconds" or the fuzzy function in which the coincidence degree score varies according to "closeness of (a specific) time stamp value".

(2-2) Step 52

Next, in step 52, the operation instruction content held in the operation instruction content storage area 21 of the record with the highest priority determined in step 51 is output to the command generating section 6.

In the present embodiment, where the variable description is used for the information held in the semantic analysis unit storage area 20, the variable value can be seen in the operation instruction content storage area 21. For example, in a coordinate recognition result, when some records in the instruction information table 10 include the variables "@X" and "@Y" stored in the semantic analysis unit storage area 20, the variable "@X" coinciding with "12" and the variable "@Y" coinciding with "23", the operation instruction content is reported by replacing the variable reference description "@X" as the value "12" and the variable reference description "@Y" as the value "23". Moreover, "@ display object (@X, @Y)" is handled as "@ display object (12, 23)" by merging the variables into the functional descriptions. In addition, in the present embodiment, the concrete data being a constituent element of the operation instruction content (or the operation instruction object "WORK_TABLE_2" where the process object is the first record and the function "@ display object" is invoked) can be obtained by invoking the function ("@ display object" in this example) previously differently defined. Similarly to step 51, the variables or functions can be easily handled by using the same technique as that used for the well-known interpreters.

(3) Process of the command generating section 6

Figure 7:
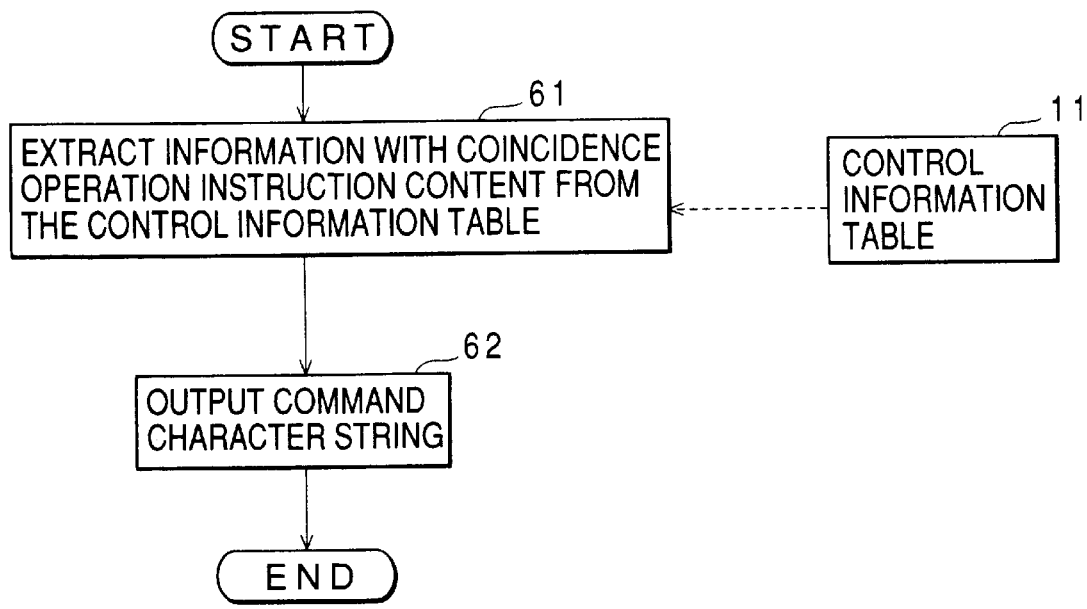
FIG. 7 is a flowchart showing an outline of the process of the command generating section according to an embodiment of the present embodiment.

FIG. 7 shows the outline of the process in the command generating section 6 according to the present embodiment. The command generating section 6 is activated when the semantic analyzing section 5 reports information of the operation instruction content in step 52.

(3-1) Step 61

The command generating section 6 first selects at least one record among records stored in the control information table 11. The selected record in which the information held in the operation instruction content storage area 22 coincides wholly or partially with the operation instruction content output from the semantic analyzing section 5, or relates thereto, and then decides the record with the highest priority among them (step 61).

(3-2) Step 62

Next, the command generating section 6 outputs the information held in the command character string storage area 23 of a record decided in the step 61 to the display section 7 or database system unit 8 (step 62). The address of the output is determined according to the content of command character string to be output.

The coincidence judging method and the method of handling variables performed in the steps 61 and 62 may be similar to the method in the steps 51 and 52, respectively. However, the control information table 11 is referred to these steps instead of instruction information table 10. Particularly, in this embodiment, the same routine may be used in a process by specifying another reference object table.

D. Embodiment of the device configuration

The device configuration of the system 120 according to the present embodiment will be described below in detail based on further detailed data.

In the present embodiment, a work station is used as the processor 14 and the main storage device 9. The database system 13 is a relational database system realized on the work station.

The touch-panel 17 is a device for detecting the contact position by touching (or bringing close) a user's finger, or the like, on a panel. The touch panel 17 is placed a capacitance-type transparent panel on display unit for the purpose of a pointing operation. The controller that detects signals from the panel is connected to the work station by way of RS-232C. RS-232C is an interface standard for computers decided by the EIA (Electronic Industries Association). The keyboard 18 and the display 19 may be commercially available ones, and a detailed explanation is not needed. A voice signal is input to the voice recognizer 16 by using a microphone as the voice input device 15. The voice recognizer 16 outputs a predetermined signal corresponding to a voice based signal.

Other devices which have the predetermined functions can be substituted for the units 15 to 19. For example, a voice recognition unit which has no intonation analyzing function, on account of the performance and the production cost, can be embodied in the present invention.

In the explanation of the present embodiment, the inputting means includes the voice recognizer 16, the touch-panel 17 and the keyboard 18. However, the present invention can be embodied by using some of those input apparatus. Similarly, the present invention can be embodied by inputting a natural language sentence or data by means of a character recognizer, mouse, data globe or data-suit acting as inputting means.

Moreover, in the present embodiment, the display 19 and the database system 13 are used as output means. However, the present invention can be embodied by using some of the output means. Similarly, the device which is controlled based on a control signal such as a voice synthesizer, expert system, decision support system, air-conditioner, microwave oven, or the like can be prepared as the output means.

The display section 7 includes a process for providing characters, graphs and tables, in addition to a display unit acting as an output device. This process is implemented using hardware or software (e.g. application software including a graphic display system, text calculating software, wordprocessor, spreadsheet, and the like). Here, for the convenience of the explanation, it is assumed that a suitable display is performed by providing an operation instruction command, corresponding to a display command, to the display section 7.

In the same way, it is assumed that the database system 13 receives an operation instruction command corresponding to a retrieval command and then retrieves data, thus obtaining the retrieval result.

As described above, even if the conventional functions are provided, the display section 7 and the database system 13 do not depend on the type. Commercially available corresponding units can be used as the display section 7 and the database system 13. The display section 7 having no operation instruction commands corresponding to commands but having a one-to-one control system corresponding to the display function can be used in the present invention. The database system 13 having no operation instruction commands corresponding to commands but having a one-to-one control system corresponding to the retrieval function, can be used in the present invention.

E. Embodiment of process

Next, the flow of the operation instruction analysis process in the system 120 according to the present embodiment will be described in detail below using a specific example. The display content detailing instruction which accompanies the voice input of "detail this" as well as the inputting of the coordinate on the touch-panel indicating the content of "this", is used as the specific example of the operation instruction.

(1) Accepting input

The voice recognition section 1 first accepts the voice inputting of "detail this" via a microphone. The voice inputting can be made using a telephone receiver instead of a microphone.

Next, the voice recognition section 1 subjects the input voice to voice recognition to convert it into the corresponding symbol string. For example, the voice recognizer matches the phoneme of a segment of the voice, accent, and intonation, and then outputs the corresponding natural language character string of "detail this".

The voice recognizer 16 outputs the corresponding symbol string in response to voice in one-to-one correspondence. For example, the symbol string may be "detail this", "DETAIL THIS" or "αβχδεφ . . .". Moreover, in a case of Japanese languages, the symbol string may be the result letters obtained by the Kana-Kanji conversion executed on wordprocessors. Therefore, a commercially-available well-known device may be used as the voice recognizer. A device with a similar function, or a device which outputs different symbol strings in response to plural different voice waveforms, can be sufficiently embodied in the present invention.

It is assumed here that a sentence "detail this" is output. However, if the data includes information needed for the recognition result selecting section 4 and the semantic analyzing section 5, the symbol string may not be a natural language sentence. For example, if the symbol string can be matched to the semantic analysis unit 20 in the instruction information table 10, any character strings can be used.

Since the voice recognizer can store information into the storage area (buffer), the symbol string can be output even if a user utters sounds one by one or words one by one during the inputting operation. Since the storage area (buffer) is well-known to persons skilled in the art, the detailed explanation will be omitted here.

Moreover, the voice recognizer may produce the symbol string corresponding to each word according to the inputting operation. The voice input device may be physically combined with the voice recognizer. Where a microphone widely spread are used, it is desirable to use the voice recognizer as a different unit. In this case, the voice recognizer may be connected to each microphone or may be connected to the computer which executes the following process.

It is desirable that the voice recognizer can produce data corresponding to the time at which input of a voice from a microphone is accepted, for example, the time at which a series of inputting operations have been completed. In this example, it is assumed that the voice recognizer outputs "14(H): 25(M): 33(S)". The time stamp may be the time at which the inputting operation has started, instead of the input completion time, or a time which is determined by a predetermined agreement. Here, the case where the inputting has been completed will be explained below. The later explanation of the present invention will clarify that the time stamp can be handled by a similar process or slightly-improved process even at a time other than the time at which the time stamp has been input.

The time stamp is used inside the device according to the present invention. It is not always necessary for the time stamp to be a readable character string, as shown in this example. A device which independently counts clock pulses inside the computer may be used. In a usage environment, the time may include year, month, date, milliseconds, or microseconds, or may include hours, minutes, and seconds.

When the voice recognizer does not produce data regarding time, the process program in the work station which accepts data ("detail this" in this example) corresponding to a voice adds the acceptance time. Since the work station which operates with a single clock source can unitarily realize a timer using the clock pulses, it is unnecessary to synchronously set the timer to be controlled by plural inputting means. Hence the work station has the advantage of facilitating the processing. Where each inputting means such as a voice recognizer and the work station are utilized via communication lines and at remote districts, when the arrival time of each input data sent from a user to the work station is lagged, it is desirable that each input and recognizer (e.g. voice recognizer) adds a time stamp to each recognition result (e.g. a voice recognition result). It is no problem to process a part of the voice recognizer as a program on the work station.

A user inputs the coordinate by touching the touch-panel 17 arranged on the display (usually with a finger). Then the touch-panel section 2 detects the X-coordinate and the Y-coordinate at the touch detected spot and then outputs the coordinate data and contact time "14(H): 25(M): 34(S)". Here, explanation is given on the condition of the touched spot having the X-coordinate 12 and the Y-coordinate 23 (hereinafter briefly represented as (12, 23)), and the touch time being "14(H): 25(M): 34(S)".

The time stamp handling and the system configuration respectively have some variations, like the voice recognition described above.

There is no limitation such as the voice inputting have to be made earlier than the inputting with a finger, or vice versa. In this embodiment, the two-modes of inputting (referred to as modal or modality) may be accepted asynchronously and at the same time.

Processors can process the inputs differently to obtain recognition results. However, since the normal processing rate of the processor is sufficiently fast, a single processor can perform a multi-tasking process (or multi-processing) to process plural pieces of modal input data. When a single processor subjects the recognition result selecting section 4 to an input data process, it is necessary to perform (at least apparently) single buffering by means of interrupt processing or exclusive processing.

Figures 8, 9:
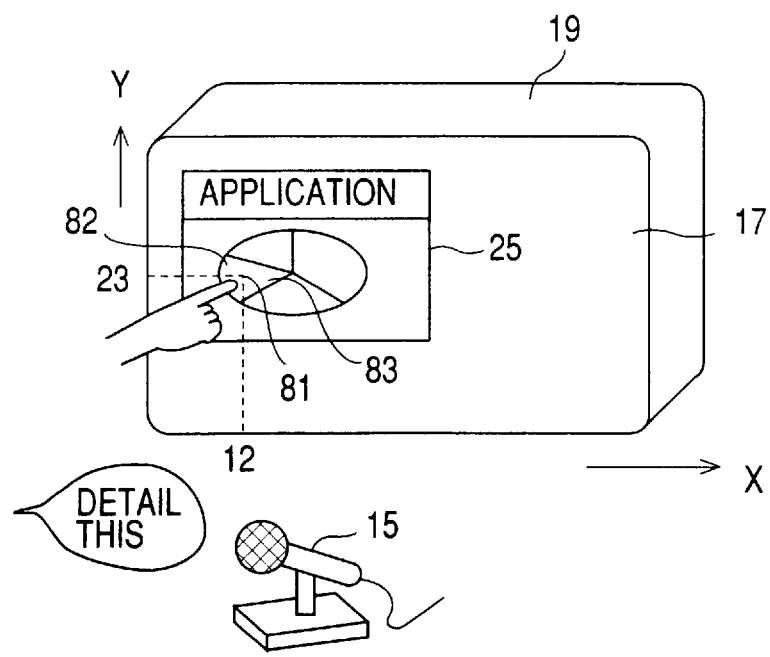
FIG. 8 is an explanatory diagram showing a state of an input operation according to an embodiment of the present invention.
FIG. 9 is a schematic diagram showing a work area which holds recognition information prior to division, according to an embodiment of the present invention.

FIG. 8 shows the external view of a two-mode input operation according to the present embodiment. In the example shown in FIG. 8, a FIG. 25 is displayed on the screen of the display 19 as a result of executing a graphical display system by means of the application software executing means. In this embodiment, a touch-panel 17 is arranged on the surface of the screen of the display 19. The transparent touch-panel 17 allows the image displayed on the display 19 to be viewed externally through it.

The inputting operation via the touch-panel 17 is accepted by detecting a touch on a desired spot of the touch-panel 17. In the example shown in FIG. 8, the spot 81 (at 12 on the X-coordinate and 23 in the Y-coordinate) of the touch-panel 17 is in contact with the finger 82. This allows the inputting of the coordinate (12 on the X-coordinate and 23 in the Y-coordinate) of the spot 81 to be accepted. In the present embodiment, the coordinate means that information is previously defined for an area 83 of the FIG. 25 displayed on the display 19.

When the microphone detects a voice "detail this" uttered, the voice inputting is accepted. In this embodiment, the voice inputting and the inputting through a touch on the touch-panel 17 can be simultaneously accepted without any trouble.

This example shows that the touch-panel 17 is touched at 14(H):25(M):34(S) and "detail this" was accepted at 14 (H):25(M):33(S) by way of the voice inputting. In this case, the voice recognition section 1 reports the recognition information consisting of the recognition result "detail this" and the time stamp "14:25:33" to the recognition result selecting section 4. The touch-panel section 2 reports the recognition information consisting of the recognition result "coordinate (12, 23) and the time stamp "14:25:34" to the recognition result selecting section 4.

(2) Selection of recognition result

The recognition result selecting section 4 which has accepted the report on recognition information stores a pair (recognition information) of the two-format recognition result and the time stamp input to the work area 32 (step 41). FIG. 9 schematically shows the state of the work area. In the work area 32 shown in FIG. 9, the recognition result storage area 26 and the time stamp storage area 27 corresponding to the number of records of the input accepted recognition information are allocated. The first record of recognition result storage area 26 stores "detail this". The time stamp storage area 27 stores "14:25:33". The second record of the recognition result storage area 26 stores (12, 23). The second record of the time stamp storage area 27 stores "14:25:34".

In step 42, the recognition result selecting section 4 first deals with the recognition result 26 in the work area 32 and then checks whether it can be divided into subdivided recognition results. In this embodiment, "phrase partition" is used as the dividing method. The recognition result selecting section 4 applies the morphological analysis and the syntactical analysis to a natural language sentence "detail this" being the result of the voice recognition, and then detects that the sentence can be divided into small phrases or that the recognition result "detail this" can be parted into "detail" and "this".

Next, the recognition result selecting section 4 estimates the time stamp of the new recognition result created by the division. In this embodiment, "the estimating method of converting "one character in a half of second" is used as an estimating method. The recognition result selecting section 4 estimates the time stamp value corresponding to the recognition result "detail" to be the time, or "14:25:31", two seconds before the original time stamp value, obtained by subtracting the time corresponding to the four characters of "this" from "14:25:33", that is, the time stamp (input end time) of the original recognition result "detail this". The recognition result selecting section 4 estimates that the time stamp of the other recognition result "this" created by the division is the same as "14:25:33".

Even when the "phrase partition" divides the recognition result in three or more, the time stamp can be sequentially determined from the later phrase. As judged from the above-mentioned example, a single or plural other dividing methods or estimating methods can be used to divide the recognition result or to estimate the time stamp.

Figures 10, 11:
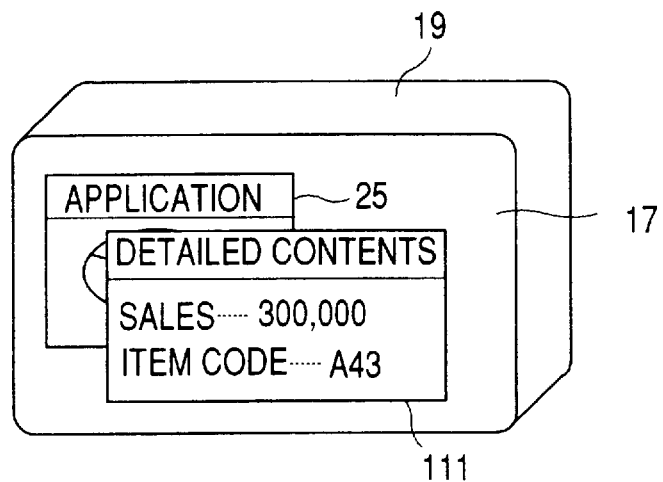
FIG. 10 is a schematic diagram showing a work area which holds recognition information after division, according to an embodiment of the present invention.
FIG. 11 is an explanatory diagram showing an example of an image display as a result of an operation instruction according to an embodiment of the present invention.

When the recognition result is divided and the time stamp thereof is estimated, the recognition result selecting section 4 deletes the original recognition result from the work area 32, allocates the areas 26 and 27 corresponding records increased through the dividing operation, as shown in FIG. 10, and then stores the records of information newly created through the dividing process to the work area 32.

When recognition information on other inputting is reported in processes of the steps 41 and 42 (within 5 seconds from the previous report), the recognition result selecting section 4 judges that recognition information to be processed as the same semantic analysis unit has been further input in the step 43, in view of a predetermined criterion (inputting from a user within 5 seconds, in the present embodiment) then process goes back to step 41.

In this example, results other than two recognition results are not newly input within 5 seconds from the previous report. Hence the recognition result selecting section 4 judges that all the recognition results to be processed as the same semantic analysis unit have been analyzed, in view of a predetermined criterion (no inputting from a user for over 5 seconds, in the present embodiment) and then goes to step 44.

Relating to the criterion in step 43, input data including a specific concept or symbol may be used to advance the process to the step 44. For example, there may be the case where a voice includes a high intonation, where the "." key is depressed during a keyboard inputting operation, where the input data includes "an imperative form of verb" in a process of Japanese, where the return key is depressed, or where the above-mentioned operations are merged as the criterion in this step.

Next, the recognition result selecting section 4 collects plural pieces of recognition information (within 5 seconds in this example) close to their time stamp one another in the step 44 and then outputs the result as a semantic analysis unit to complete the process. Hence, three pieces of recognition information (illustrated in FIG. 10) held in the work area 32 are output as a single analysis unit to the semantic analyzing section 5.

(3) Detection of operation instruction content

The semantic analyzing section 5 which has accepted the report collates the semantic analysis unit output by the recognition result selecting section 4 with the semantic analysis unit 20 in the instruction information table 10 previously prepared and then detects a coincidence record (step 51).

If it is assumed that the instruction information table 10 holds the concrete data shown in FIG. 3, the reported semantic analysis unit coincides with the second record in the instruction information table 10 (the record held in the second line area). That is, the time stamp "14:25:31" corresponding to the recognition result "detail" coincides with "variable S" (this coincidence is usually called unification). The time stamp "14:25:33" corresponding to the recognition result "this" coincides with "variable T". The relational expression "T<S+4" is held between the variable S and the variable T. As a result of the recognition result from the touch-panel, "12" coincides with "variable X" while "23" coincides with "variable Y". The time stamp "14:25:34" corresponding to the recognition result coincides with "variable U" and the expression "|U-T|<2" is held between the variables T and U. Hence, on the assumption that the second record coincides with the reported semantic analysis unit, the semantic analyzing section 5 detects the second record. The coincidence object may be formed of plural records. In this case, it is desirable to be selected uniquely at the time or following time using a certain method (such as a user's selection). In this embodiment, when plural records are detected, the semantic analyzing section 5 selects a record with the highest priority as the object to be processed in the step 52 according to the priority determined by the coincidence degree.

Next, the semantic analyzing section 5 outputs data held in the operation instruction content storage area 21, the coincidence of which is detected in the step 51, to the command generating section 6 (step 52).

In this example, the operation instruction content storage area 21 of the second record holds "display" as the operation instruction function, "detail" as the operation instruction condition, and "@tableID(@X,@Y)" as the operation object. The operation object is in a function description. However, in the step 51, since the variable X is 12 and the variable Y is 23, the function is equivalent to "@tableID (12,23)". Moreover, the function "tableID" is previously prepared as a function returning the identifier name of an existing table corresponding to the argument's coordinate. Thus as a result, "WORK_TABLE_2 ", for example, can be obtained as an operation object. The semantic analyzing section 5 actually notifies an operation instruction function "display", an operation instruction condition "detail", and an operation object "WORK_TABLE_2" to the command generating section 6.

The variable reference or function application may be carried out in the step 52 in the present embodiment. Otherwise, the variable reference or function application may be output as the symbol string in the step 25 and performed in the command generating section 6 (to be described later)

(4) Command generation

The command generating section 6, which has been notified of the operation instruction content, collates the operation instruction function output from the semantic analyzing section 5 with the operation instruction content 22 in the control information table 11 previously prepared, and then extracts the coincidence information (step 61).

With the control information table 11 holding the specific data shown in FIG. 4, the operation instruction content reported coincides with the first record of the control information table 11 (record held in the area on the first line). Like the previous instruction information table, the description in the control information table 11 may be a variable description, expression description, or function description. In this example, "WORK_TABLE_2" as an operation object coincides with "variable A". The command generating section 6 detects the first record as one that is coincident with the operation instruction content reported. A single record can be detected in this example. When plural records are detected, the command generating section 6 selects the record with the highest priority as the object to be processed in the step 62 according to the priority determined by the degree of coincidence.

Next, the command generating section 6 outputs the data held in the command character string storage area 23 of the first record detected in the step 61 to the display section 7 or database management system section 8 (step 62).

In this example, the command character string to be output is "Display -detail @A". As a result, "Display -detail WORK_TABLE_2" can be obtained as the command character string by referring to the variable A. The command character string is a command for data managed by the display section 7 or database management system section 8. For the convenience of the explanation, the command character string "Display -detail WORK_TABLE_2" is a command for the display section 7 which instructs displaying information (such as attribute, column data, or cell data) contained in a table whose the identifier is "WORK_TABLE_2". However, the command generating section 6 may generate merely a command to operate a device to be controlled. It is unnecessary to guarantee syntactical correctness or possibility of execution in the command character string created.

In this example, the operation instruction content is converted into a display command for the display section 7. However, the operation command instruction content can be converted into a retrieve/update command to the database management system section 8 by describing a retrieval language such as SQL (Structured Query Language) to the corresponding command character string 23. In other words, even when the semantic analysis result based on both the voice "detail this" and the input signal instructing the coordinate (12, 23) is the same as the operation instruction content explained above, the command "retrieve to obtain detail information" instead of the command "detail the display content" can be output according to the command character string defined in the control information table 11.

With the control information table 11 in which the corresponding relationships are prepared, a different means (such as an inquiry to a user) may output a more suitable command. In order to judge and execute whether the command character string can be executed, the command character string can be executed by which system should execute, or whether a symbol modification or signal conversion is further needed, the command character string judging, modifying, or converting process may be inserted between the process of the command generating section 6 and the process of the display section 7 or the database system 13.

(5) Command execution

The display section 7 receives the report of the command character string and then changes the image displayed on the screen of the display 19 shown in FIG. 11, according to the reported command character string. That is, in this example, when the display section 7 executes the command, the display is changed so that a window (a rectangular area overlapped on an image already displayed) is displayed on the screen. The content of a table (not shown) is displayed on the window. The table previously holds the detailed content of data previously defined on the indicated area 83.

F. Effect of the present embodiment

As described above, according to the present embodiment, a control device is provided which complementary recoveries and analyzes the operation instruction contents of input signals from plural interfaces, such as a natural language sentence input by means of voice, and a finger's position indication input by means of a touch-panel, in consideration of isochronous, and then operates a controlled device (such as a display or database system).

Now let us explain "complementary recovery" using the current example. If there is only a voice input "detail this", it is difficult to specify the object corresponding to "this". If the inputting is made only to indicate the coordinate (12,23), it is difficult to specify what the coordinate indicates (e.g. displayed object, constituent elements smaller than the displayed object, a display itself, or the like), or to specify how the indicated object should be processed. However, according to the present embodiment, two pieces of input information are interpreted by compensating for the missing portion of the operation instruction content. This compensation is called "complementary recovery".

In this embodiment, the input time of the input information is suitably estimated by the input signals from the plural interfaces. The input information accepted via plural input means are mutually related based on the estimated time. The operation instruction content is subjected to complementary recovery and then interpreted. Moreover, in the present embodiment, the command character string used to control the control object device can be created corresponding to the operation instruction content interpreted. Also, according to the present embodiment, a suitable single operation object can be identified based on the input information from the plural interfaces.

In the information processing system including plural interfaces, the user using the analyzing device according to the present embodiment can provide asynchronously (or synchronously), arbitrarily and freely, an operation instruction to the plural interfaces without recognizing the exclusive selectivity in time. Hence, the present embodiment can eliminate the troublesome procedure of switching the plural interfaces such as a mouse and keyboard, according to the predetermined sequence. Moreover, the operation instruction can be input at an arbitrary timing (or the same timing) to operate the control object device by combining a daily used natural language with a GUI.

Moreover, according to the embodiment, learning the formal language (special format commands determined for computers) is not necessary to use the natural language analyzing method. Since the inputting is accepted at an arbitrary timing, it is not necessary to learn the input procedure. Hence users unfamiliar with the operation can freely operate the control object devices.

As described above, the present embodiment can provide the interface (often called multi-modal interface) that simultaneously analyzes plural modes from a single or plural input means to operate the control object device.

In the present embodiment, when each of the semantic analysis result and the command creation result includes plural candidates, the candidate with the highest priority is selected and output. However, the recognition result, semantic analysis result, or the command creation result may be output to a user and may be selectively accepted by the user. In such a way, the user can find errors earlier or can indicate that supplemental information is added.

G. Example of other configuration

Figure 16:
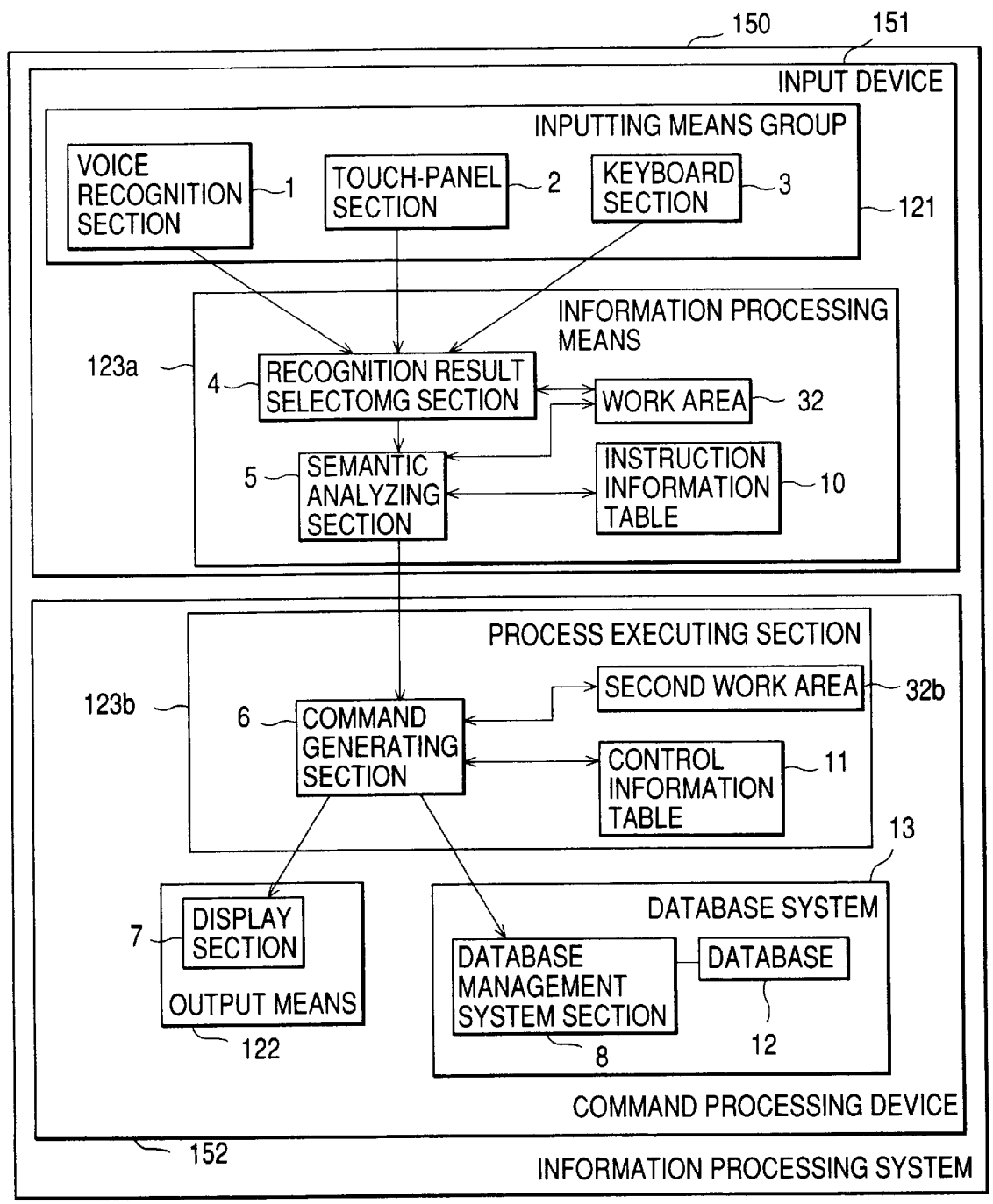
FIG. 16 is a functional block diagram of an embodiment according to the present invention.

In the present embodiment, it has been explained that the input means group 121 is an input apparatus. However, the input means group 121, the recognition result selecting section 4, the semantic analyzing section 5, and the instruction information table 10 can be integrated into a single input device. FIG. 16 shows an example of the functional block diagram.

In the configuration shown in FIG. 16, the information processing system 150 includes the input device 151 and the command processing device 152. The input device 151 includes the information processing means 123a and the inputting means group 121 having plural inputting means 1 to 3. The information processing means 123a has the recognition result selecting section 4, the semantic analyzing section 5, the work area 32, and the instruction information table 10. The input device 151 divides and/or merges plural pieces of information input via the plural inputting means 1 to 3 and then outputs them as an operation instruction content collected in a semantic analysis unit. The command processing device 152 includes the process executing means 123b having the command generating section 6, the control information table 11, the second work area 32b, the output means 122, and the database system 13. The command processing device 152 creates a command to be passed to the output means 7 or database system 12, in response to an operation instruction collected in a semantic analysis unit, then makes the output means 7 or database system 12 execute the command. It may be considered that the whole command processing device 152 consists of the process executing means in the information processing system 150. The second work area 32b is a temporary storage area for processing the command generating section 6.

In the case of such a configuration, the input device 151 and the command processing device 152 may be separately realized using an information processing device. Such a hardware configuration is shown in FIG. 17.

Figure 17:
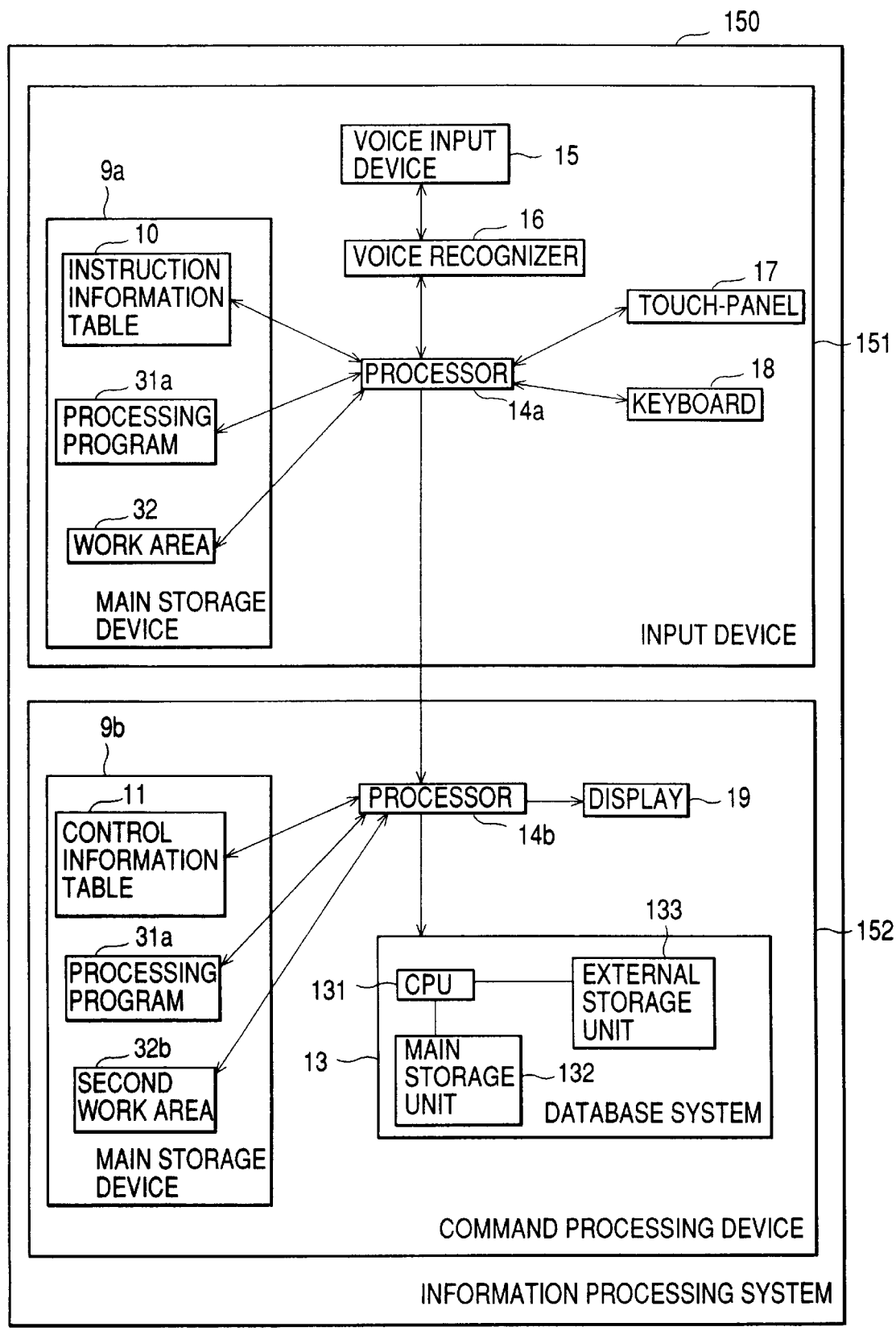
FIG. 17 is a structural diagram showing the hardware of an embodiment according to the present invention.

In the configuration shown in FIG. 17, the input/output device 151 consists of an information processing device including a main storage device 9a, a processor 14a, the voice input device 15, the voice recognizer 16, the touch panel 17, and the keyboard 18. In the constitute elements of the information processing means 123a, the instruction information table 10 and the work area 32 correspond to a storage area allocated in the main storage device 9a. The recognition result selecting section 4 and the semantic analyzing section 5 are implemented by executing the instructions held in the process program storage area 31a in the main storage device 9a by means of the processor 14a.

The command processing device 152 consists of an information processing device including a main storage device 9b, a processor 14b, the display 19, and the database system 13. In the process executing means 123b, the second work area 32b and the control information table 11 correspond to the storage area allocated in the main storage device 9b. The command generating section 6 is implemented by executing the instructions held in the process program storage area 31b in the main storage device 9b by means of the processor 14b. The CPU 131 in the database system 13 may be the same as the processor 14b in the command processing device 152.

H. Other embodiments

In the above-described explanation, the input signals accepted via the touch-panel 17 and the voice input device 15 are complementarily recovered and interpreted. However, other input means may accept the input. Now, two other input means will be explained as follows:

(1) Voice recognizer and eye tracker

Figure 12:
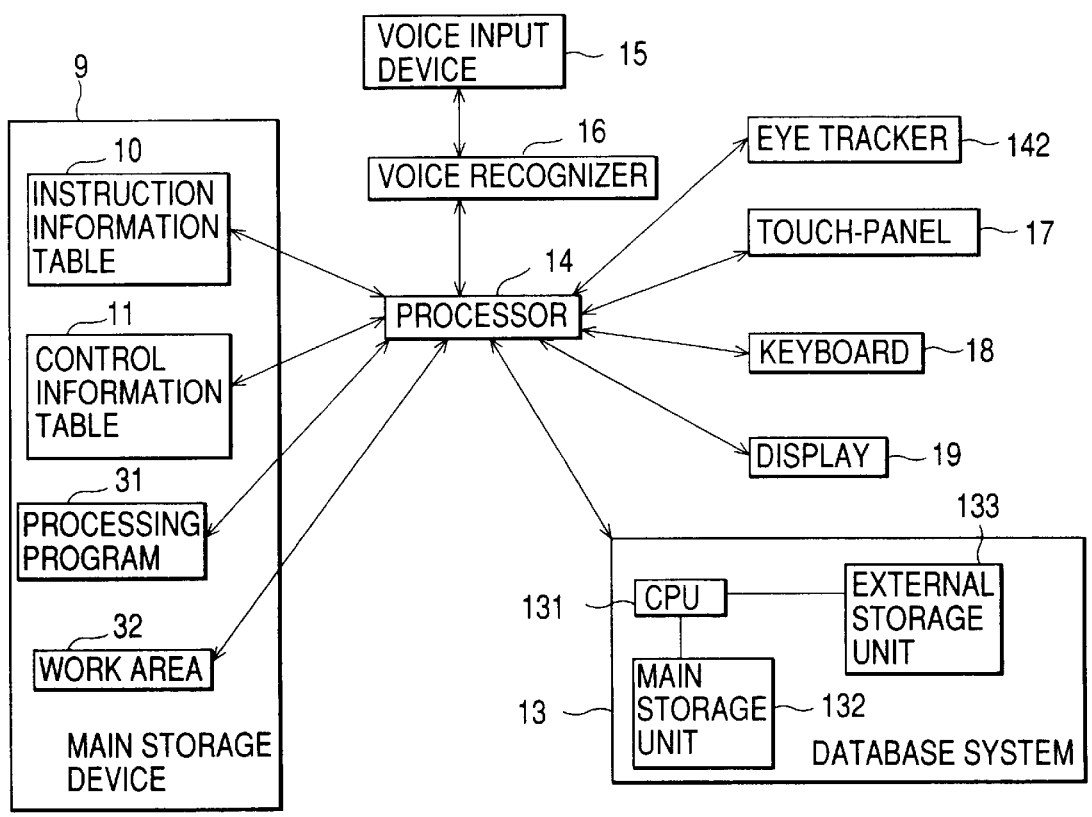
FIG. 12 is a structural diagram showing the hardware of an embodiment according to the present invention.
Figure 13:
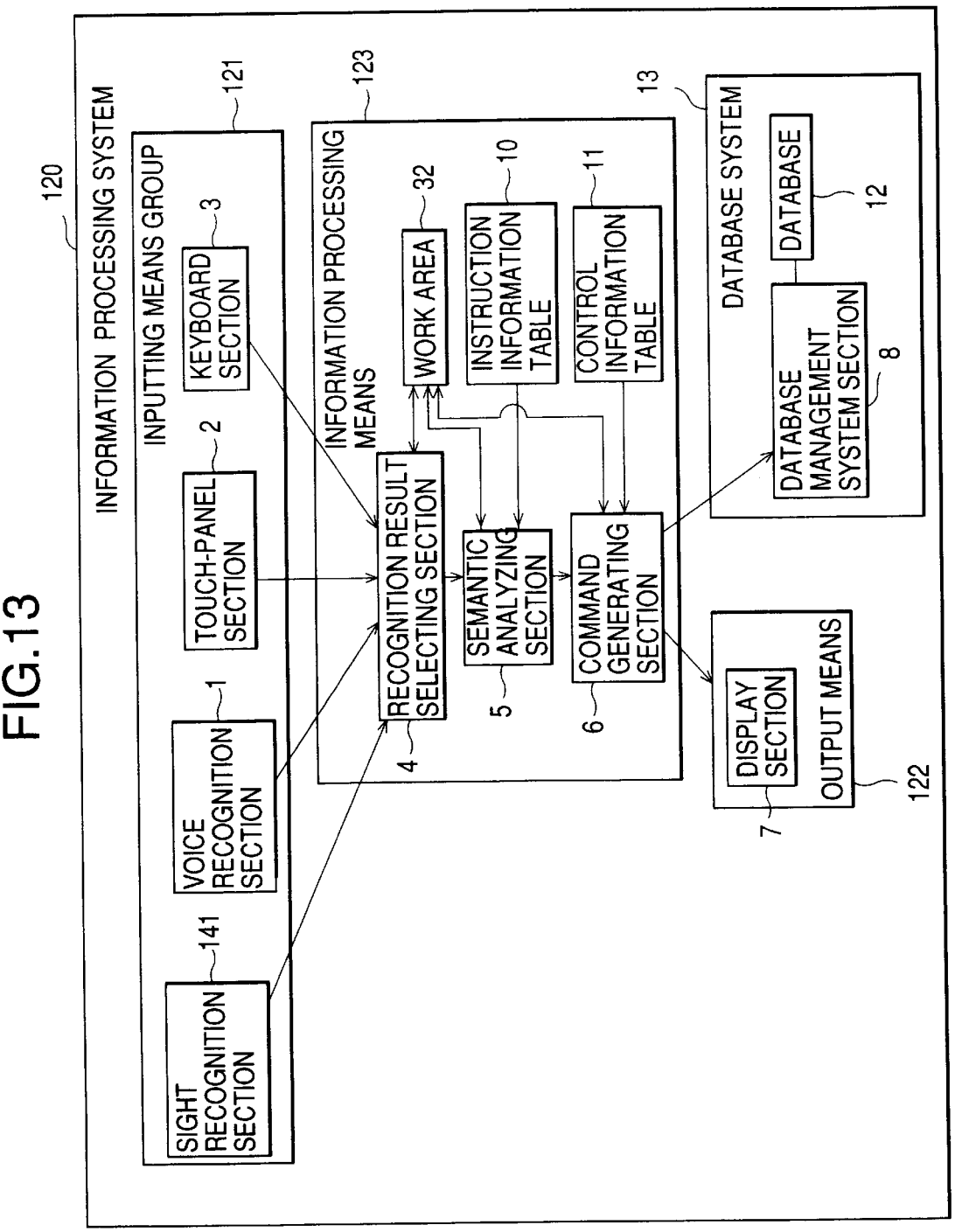
FIG. 13 shows a functional block diagram of an embodiment according to the present invention.

In the modification of the embodiment according to the present invention, the case where the voice recognition section 1 and the sight recognition section 141 are used as an inputting means is explained. In this case, the hardware configuration is shown in FIG. 12 and the functional block diagram is shown in FIG. 13. In the present embodiment, the sight recognition section 141 is further arranged in the inputting means group 121 as shown in FIG. 13. The sight recognition section 141 is realized using an eye tracker 142 shown in FIG. 12. Elements similar to those described in the before-mentioned embodiments are not explained below.

The eye tracker is an apparatus which detects at where a user looks. For example, the sight is recognized by irradiating infrared rays onto a user's eyeball and then using the reflected rays, or by photographing the user's face (particularly the eyes) with a television camera and then using the image data. The eye tracker according to the present embodiment is a device which captures a sight recognition result in time sequence (e.g. every 0.1 seconds), adds a time stamp every sight recognition result (e.g. the value of a coordinate or direction vector), and then outputs the result.

When a user's sight moves from a point to another point, the sight recognition result provides a course. In the present embodiment, when some sight recognition results obtained continuously based on the object existing in the course are merged as a piece of data, the time attribute (time stamp or time range) is estimated and added to the recognition result (that is, object) after the merging operation. In more detail, the time stamp at the intersection of the course and the contour of an object may be complementarily decided based on a pair of the previous sight recognition result and the time stamp.

Moreover, in such a situation, it is assumed that a user has simultaneously input a voice instruction "detail this, this and this". Like the embodiments already described, the indication can be analyzed as "object (on the course of the sight recognition result)" corresponding to "this", based on the time stamp. Hence, the corresponding command sequence can be created based on the analysis result.

Thus, according to the present embodiment, even when the recognizer continuously outputs recognition results, the operation instruction content can be analyzed by suitably merging the recognition results with each of the objects, then by estimating and re-adding the time attribute of each of the objects, and by complementarily recovering of the recognition result with the recognition result from another recognizer.

(2) Voice recognizer and graphic recognizer

Figure 14:
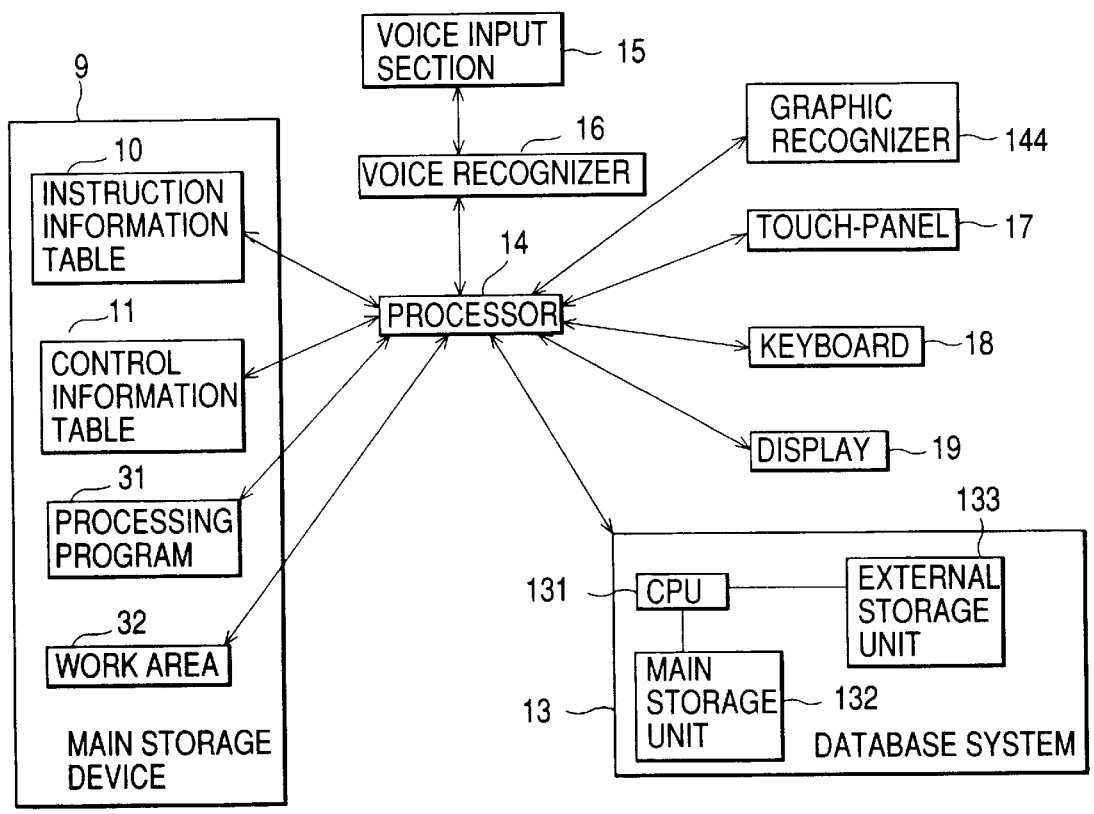
FIG. 14 is a structural diagram showing the hardware of an embodiment according to the present invention.
Figure 15:
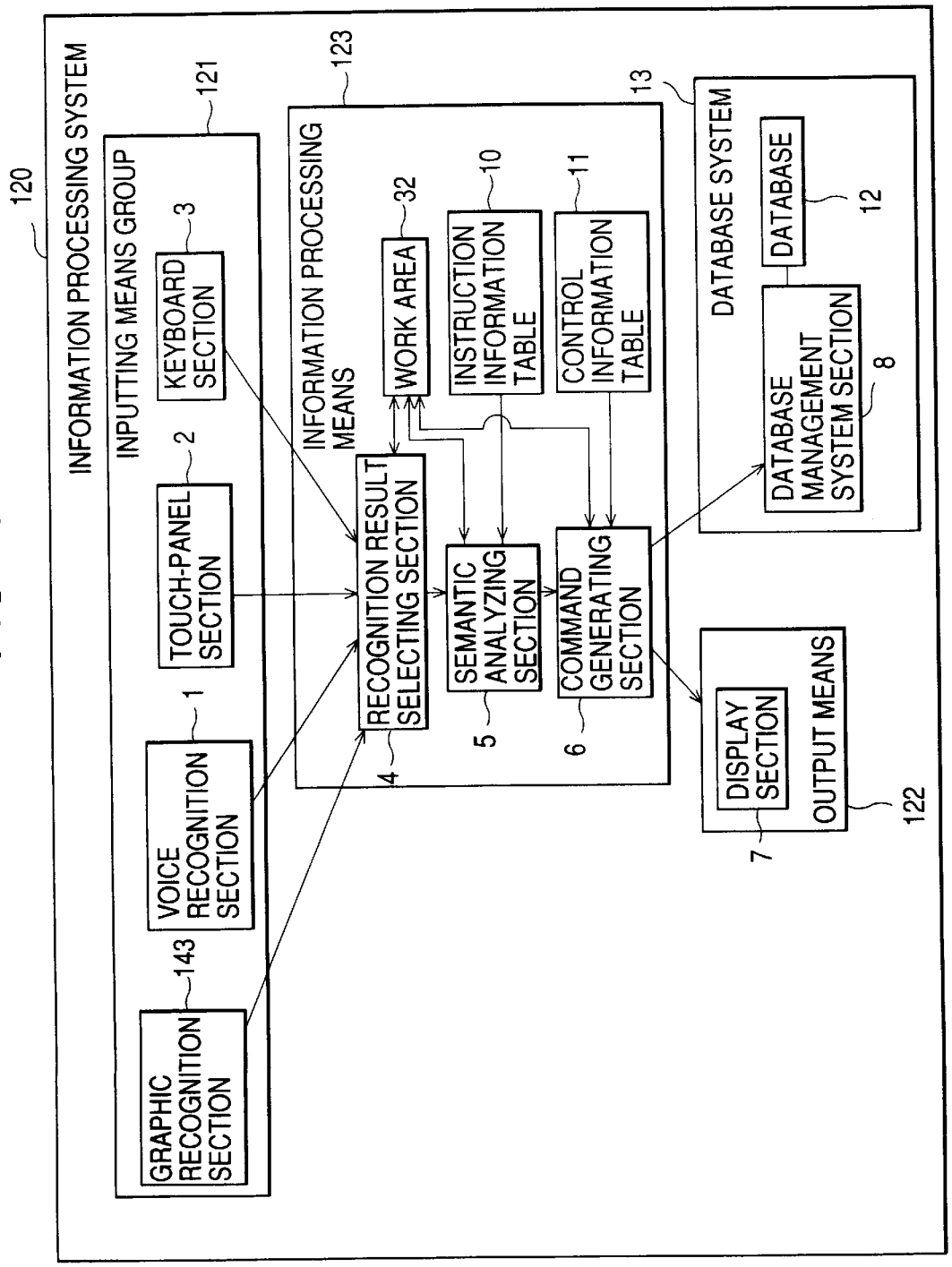
FIG. 15 is a functional block diagram of an embodiment according to the present invention.

In another modification of the embodiment according to the present invention, the case where the voice recognition section 1 and the graphic recognition section 143 is used for the input means will be explained here. In this case, the hardware configuration is shown in FIG. 14 and the functional block diagram is shown in FIG. 15. In the present embodiment, as shown in FIG. 15, the graphic recognition section 143 is arranged additionally to the inputting means group 121. The graphic recognition section 143 is realized with the graphic recognizer 144 shown in FIG. 14. In the following description, the explanation of the elements similar to those in the previous embodiment will be omitted.

The graphic recognizer 144 is a device which recognizes hand-written or printed characters or figures. For example, the character or figure is recognized according to the movement (particularly, stroke) of the nib of a pen used by a user. The character and figure are recognized based on image data captured by means of a television camera, image scanner or the like, in a predetermined method.

By detecting the movement of the nib of a small pen-type image scanner, the graphic recognizer 144 according to the present embodiment which recognizes information defined by the scanner's trace. That is, when a user draws a desired figure, character or image, using the nib of an image scanner, or traces a figure or character on a drawing or document previously prepared, the graphic recognizer 144 recognizes data previously defined on the character or figure or the traced area. Moreover, the graphic recognizer 144 detects as the input time stamp the time at which the scanner has started reading and the time at which the reading has been completed and then outputs them together with the characters recognized.

Here, explanation is given for the case where users simultaneously input a voice instruction "mail this map to him"; the image scanner inputs the map indication during voice-inputting of "this map"; and the image scanner inputs person's names recorded in an address notebook during voice-inputting of "him".

As describe above, the recognition result selecting section 4 divides or merges data on the recognition result from each of the input means 1 and 143 and then suitably estimates and re-adds the time attribute. In this case, even when plural maps or person's names are input, a closer person's name can be identified using the time attribute, compared with the time stamp of the voice inputting.

Even when the image scanner captures an extra character or figure during the inputting of the map, only the map portion can be handled as an object for the semantic analysis by cooperating with data through the voice inputting. In the same way, since it is recognized that the user has no interest in the character string or ruled lines, except the person's names listed on the address notebook, by analyzing the voice inputting "him", the information requested can be suitably selected from miscellaneous information input with the image scanner can be selected, so that a suitable semantic analysis can be performed.

The present embodiment can provide the method of recognizing and suitably analyzing by using the input-related time attribute and information from other input apparatuses even when the user unintentionally inputs extra data, together with necessary data.

We claim:

1. An input device comprising plural inputting means and a recognition result selecting section, wherein said recognition result selecting section includes:

input time recognizing means for recognizing an input time of input information accepted via each of said plural inputting means;

means for dividing or merging said input information into a predetermined primitive analysis unit to obtain a recognition result;

means for estimating an input time of said recognition result using an estimating method predetermined for each of said inputting means; and means for collecting some of said recognition results whose estimated input times are close to one another, and outputting collected information as a semantic analysis unit.

2. The input device in accordance with claim 1, wherein at least one of said plural inputting means comprises notifying means for notifying said recognition result selecting section of input information and an input time of said input information; and wherein said input time recognizing means recognizes the notified time as an input time of the notified input information in a case where the input time is notified from said inputting means, together with the input information, and recognizes the time at which the input information has been accepted as an input time of accepted input information in a case where the input time from said inputting means is not notified together with the input information.

3. The input device in accordance with claim 1, wherein said input time recognizing means recognizes the time at which said input information has been accepted as an input time of the input information accepted by said input time recognizing means.

4. The input device in accordance with claim 1, wherein said estimating method is a method of estimating the input time of the recognition result, based on the input time of the input information and an estimated input rate predetermined.

5. The input device in accordance with claim 1, wherein said plural inputting means include at least one of a voice recognizer, a touch-panel, a keyboard, a mouse, an eye tracker, and a graphic recognizer.

6. The input device in accordance with claim 1, wherein at least one of said input information is information in a natural language.

7. The input device in accordance with claim 6, wherein said estimating method of the input time of said input information in the natural language is a method of estimating said input time based on a time attribute of the natural language.

8. The input device in accordance with claim 7, wherein said time attribute of the natural language is at least one selected from the group of information on an input operation of said natural language, information on a character string, information on voice, information on morphemes, information on syntax, information on a device to be controlled, and information on a control procedure for said device to be controlled.

9. The input device in accordance with claim 6, wherein said primitive analysis unit of said input information in the natural language is determined based on one selected from the group of paragraph, sentence, phrase, word, morpheme, and phoneme of said input information.

10. The input device in accordance with claim 1, wherein said estimating method is a method of estimating an input time, based on at least one selected from the group of information on input operation, information on the amplitude of an input signal, information on a device to be controlled, and information on a control procedure for said device to be controlled.

11. The input device in accordance with claim 1, wherein said input time is an input start time or an input end time.

12. An information processing system comprising:
   plural inputting means for accepting input information;
   a recognition result selecting section for making a semantic analysis unit from at least one piece of input information accepted via said inputting means;
   a semantic analyzing section for outputting instruction information predetermined for each said semantic analysis section; and
   process executing means for executing a process predetermined according to said instruction information;
   said recognition result selecting section including:
      means for recognizing an input time of said input information accepted via said inputting means;
      means for dividing or merging said input information into a predetermined primitive analysis unit to obtain a recognition result;
      means for estimating an input time of said recognition result using an estimating method predetermined according to said inputting means; and
      means for collecting some of said recognition results whose estimated input times are close to one another, and for notifying said semantic analyzing section of the collected information as a semantic analysis unit.

13. The information processing system in accordance with claim 12, further comprising an instruction information table that previously holds said instruction information corresponding to said semantic analysis unit; and wherein said semantic analyzing section detects said instruction information corresponding to said semantic analysis unit notified by referring to said instruction information table, and then outputs said detected instruction information.

14. The information processing system in accordance with claim 12, further comprising a control information table which holds information representing the process corresponding to said instruction information; and wherein said process executing means detects the process corresponding to said instruction information referring to said instruction information table, and then executes said detected process.

15. The information processing system in accordance with claim 12, wherein at least one of said plural inputting means includes means for notifying said recognition result selecting section of input information and the input time of said input information; and wherein said input time recognizing means recognizes the notified time as an input time of the input information in a case where said input time from said inputting means is notified together with notified input information, and recognizes the time at which said input information has been accepted as an input time of accepting the input information in a case where the input time from said inputting means is not notified together with input information.

16. The information processing system in accordance with claim 12, wherein said input time recognizing means recognizes the time at which said input information has been accepted by said input time recognizing means, as the input time of the accepted input information.

17. The information processing system in accordance with claim 12, wherein said estimating method is a method of estimating the input time of said recognition result, based on the input time of the input information and an estimated input rate predetermined.

18. The information processing system in accordance with claim 12, said plural inputting means includes at least one of a voice recognizer, a touch-panel, a keyboard, a mouse, an eye tracker, and a graphic recognizer.

19. The information processing system in accordance with claim 12, further comprising at least one device to be controlled which operates according to a command; and wherein said process executing means issues the command predetermined according to the instruction information to said device to be controlled.

20. The information processing system in accordance with claim 19, said device to be controlled includes at least one selected from the group of a display device, a database system, a printer, a video tape recorder, a voice synthesizer, a decision support system, an expert system, an operating system, a schedule management system, an address management system, a game system and a navigating system.

21. The information processing system in accordance with claim 12, said semantic analyzing section outputs, as said instruction information, a candidate with the highest priority among plural instruction information candidates predetermined according to the semantic analysis unit.

22. The information processing system in accordance with claim 12, said process executing means executes a candidate with the highest priority among plural process candidates predetermined according to the instruction information.

23. The information processing system in accordance with claim 12, further comprising a display device; and wherein said semantic analyzing section displays instruction information candidates on said display device and selectively accepts a selection of said candidates via said inputting means and then outputs the selected candidate.

24. The information processing system in accordance with claim 12, further comprising a display device; and wherein said process executing means displays the process candidates on said display and accepts a selection of said candidates via said inputting means and then executes the process of selected candidate.

25. The information processing system in accordance with claim 12, further comprising a display device; and wherein said recognition result selecting section displays said semantic analysis unit on said display device.

26. The information processing system in accordance with claim 12, further comprising a display device; and wherein said semantic analyzing section displays said instruction information on said display device.

27. The information processing system in accordance with claim 12, further comprising a display device; and wherein said process executing means displays information showing the content of said execution process on said display device.

28. The information processing system in accordance with claim 12, wherein at least one of said plural pieces of input information is information in a natural language.

29. The information processing system in accordance with claim 28, wherein said method of estimating the input time of said input information in the natural language is a method of estimating said input time based on a time attribute of said natural language.

30. The information processing system in accordance with claim 29, wherein said time attribute of the natural language is at least one selected from the group of information on an input operation of the natural language, information on a character string, information on voice, information on morphemes, information on syntax, information on a device to be controlled, and information on a control procedure for said device to be controlled.

31. The information processing system in accordance with claim 28, wherein said primitive analysis unit of said input information in the natural language is determined based on one of said group of paragraph, sentence, phrase, word, morpheme, and phoneme of said input information.

32. The information processing system in accordance with claim 12, wherein said estimating method is a method of estimating an input time, based on at least one selected from the group of information on input operation, information on the amplitude of an input signal, information on a device to be controlled, and information on control procedure for said device to be controlled.

33. The information processing system in accordance with claim 12, wherein said input time is an input start time or an input end time.

34. An input information managing method which manages plural pieces of input information accepted via plural input means, comprising the steps of:

recognizing an input time of said input information;

obtaining a recognition result by dividing or merging said input information into a primitive analysis unit;

estimating an input time of said recognition result using an estimating method predetermined for each of said inputting means; and collecting some of said recognition results whose estimated input times are close to one another, and then managing the collected information as a semantic analysis unit.

* * * * *